United States Patent
Oh et al.

(10) Patent No.: US 8,219,152 B2
(45) Date of Patent: Jul. 10, 2012

(54) MOBILE TERMINAL AND CONTROL METHOD THEREOF

(75) Inventors: Jung-A Oh, Seoul (KR); Tae-Hoon Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 12/414,349

(22) Filed: Mar. 30, 2009

(65) Prior Publication Data

US 2010/0056220 A1    Mar. 4, 2010

(30) Foreign Application Priority Data

Sep. 3, 2008  (KR) ........................ 10-2008-0086956

(51) Int. Cl.
  *H04M 1/00*  (2006.01)
(52) U.S. Cl. .................. 455/566; 455/550.1; 455/158.4; 345/173
(58) Field of Classification Search ............... 455/550.1, 455/566, 158.4, 158.5, 145; 345/169, 173
See application file for complete search history.

(56) References Cited

U.S. PATENT DOCUMENTS

| | | | |
|---|---|---|---|
| 7,142,195 B2 * | 11/2006 | Northway et al. | 345/169 |
| 7,859,518 B1 * | 12/2010 | Northway et al. | 345/169 |
| 7,903,093 B2 * | 3/2011 | Kim et al. | 345/173 |
| 2007/0232336 A1 * | 10/2007 | Kim et al. | 455/466 |
| 2008/0014787 A1 * | 1/2008 | Kim et al. | 439/517 |
| 2008/0125181 A1 * | 5/2008 | Yoon | 455/566 |
| 2009/0017875 A1 * | 1/2009 | Boesen | 455/566 |
| 2009/0201260 A1 * | 8/2009 | Lee et al. | 345/173 |
| 2009/0298548 A1 * | 12/2009 | Kim et al. | 455/566 |
| 2009/0312063 A1 * | 12/2009 | Soto Nicolas | 455/566 |

* cited by examiner

*Primary Examiner* — Cong Tran
(74) *Attorney, Agent, or Firm* — Lee, Hong, Degerman, Kang & Waimey

(57) ABSTRACT

A mobile terminal is presented. The mobile terminal includes a display module comprising a front surface and a rear surface, a display controller for displaying an object associated with a first menu on at least one of the front surface or rear surface, a user input unit configured to receive a touch input via the front and rear surface of the display module for selecting one of the displayed objects, and a controller configured to execute an operation associated with the selected object according to which of the front and rear surface is touched.

22 Claims, 23 Drawing Sheets

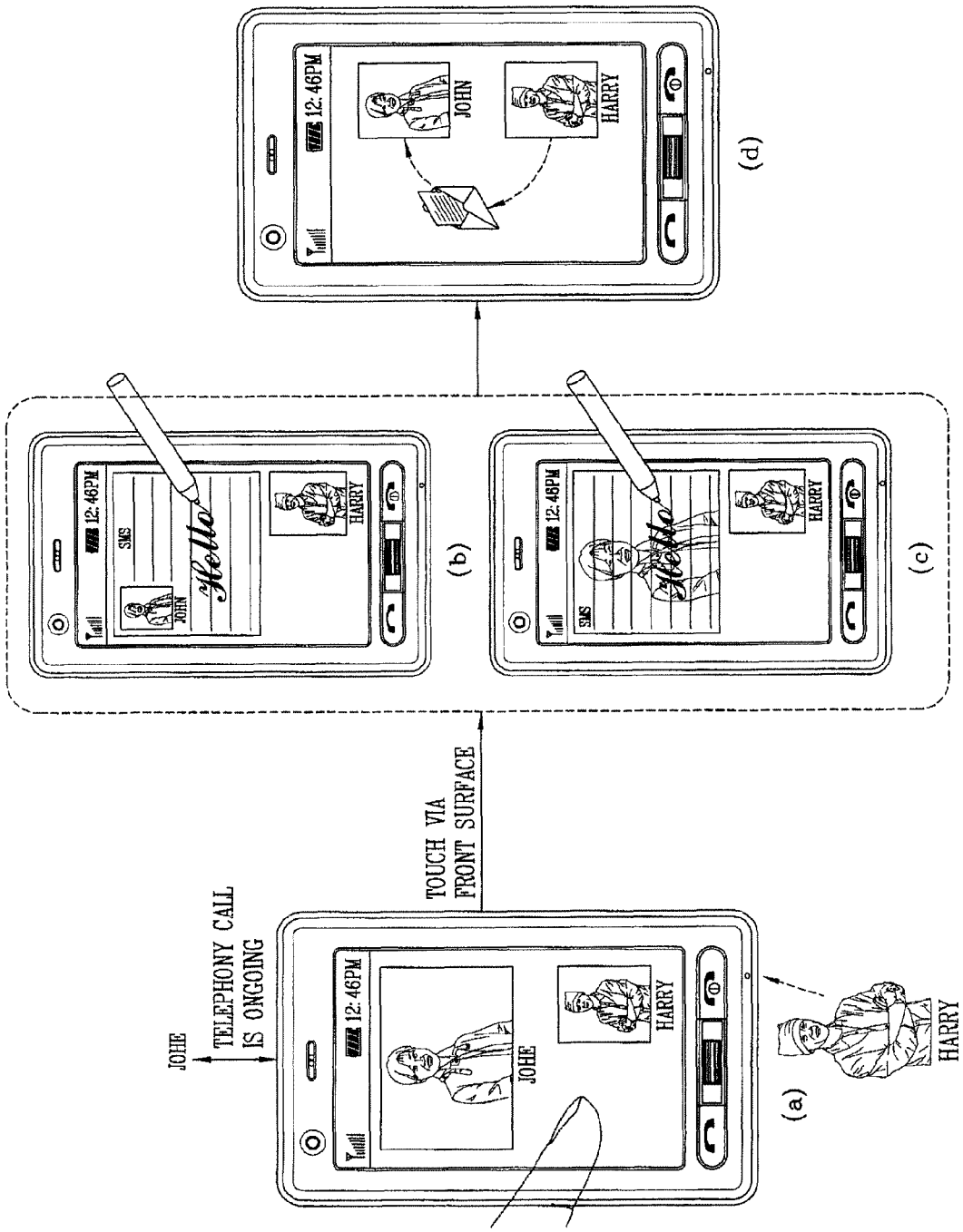

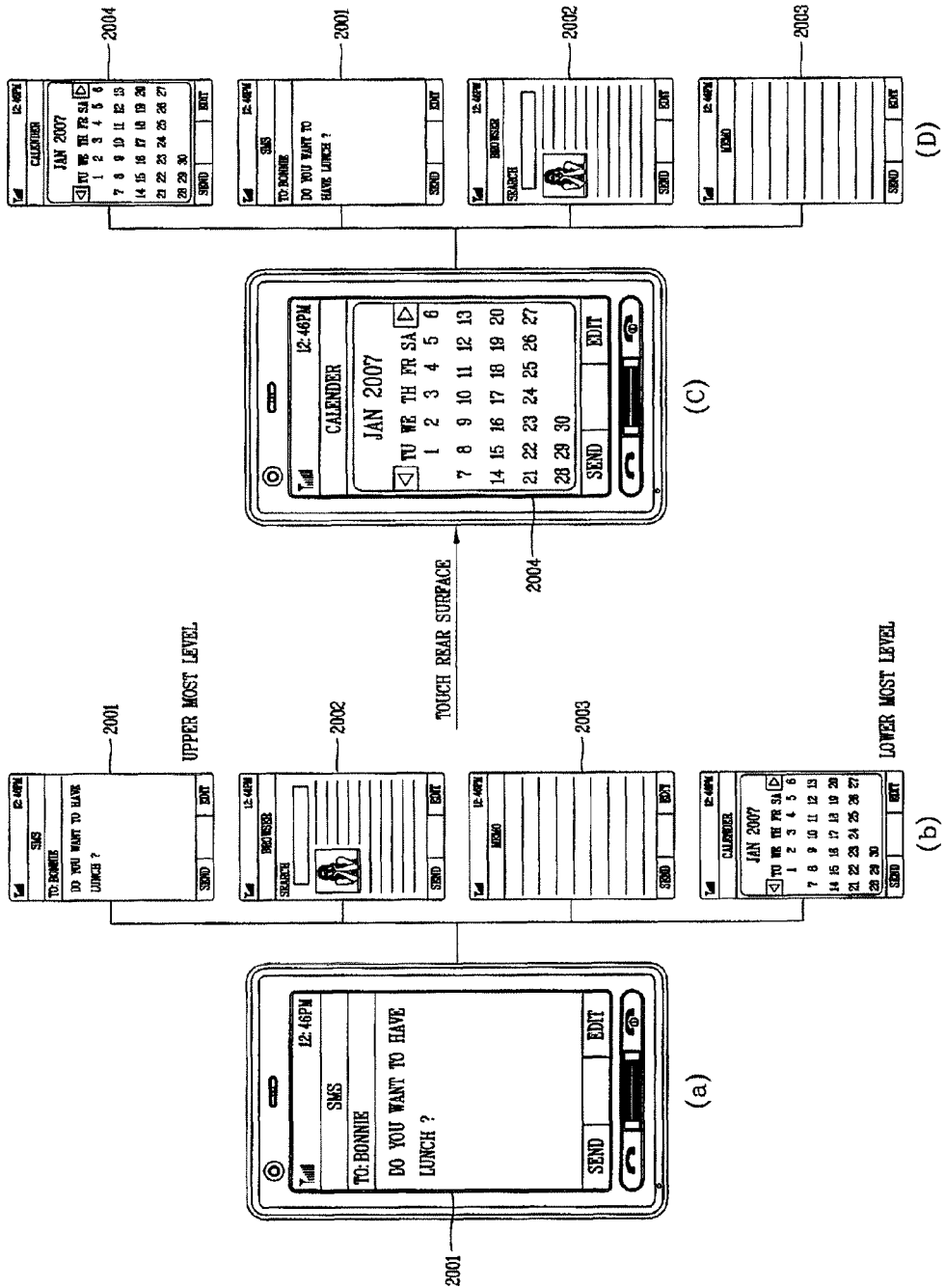

MOBILE TERMINAL AND CONTROL METHOD THEREOF

CROSS-REFERENCE TO RELATED APPLICATIONS

This application claims the benefit of earlier filing date and right of priority to Korean Application No. 10-2008-0086956, filed on Sep. 3, 2008, which is herein expressly incorporated by reference in its entirety.

BACKGROUND OF THE INVENTION

1. Field of the Invention

The present invention relates to a mobile terminal capable of selecting a displayed object and executing a function associated with the displayed object.

2. Discussion of the Related Art

As more functions are added to terminals such as personal computers, laptop computers, and cellular phones, the terminals become multimedia players with multiple functions such as capturing pictures or videos, playing music, displaying videos, providing games, and receiving broadcasting programs.

Terminals may be divided into mobile terminals and stationary terminals. Mobile terminals may be classified into handheld terminals and vehicle mount terminals according to the portability of the terminals.

As terminals provide more complex and various functions, a menu structure associated with the functions becomes complicated. Thus, a user must navigate through various complicated menus to access a desired function. Accordingly, efforts have been made to simplify the complicated menu structure to provide a convenient user interface. Recent mobile terminals include a touch screen for receiving a user input. The touch screen may replace the traditional keypad on a mobile terminal. Accordingly, as touch screens become more prevalent in mobile terminals, users desire enhanced methods for selecting an object displayed on the touch screen and executing a function associated with the selected object. Therefore, the present invention provides a method for selecting an object displayed on a touch screen and executing a function associated with the displayed object.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to one embodiment, a mobile terminal is presented. The mobile terminal includes a display module comprising a front surface and a rear surface, a display controller for displaying an object associated with a first menu on at least one of the front surface or rear surface, a user input unit configured to receive a touch input via the front and rear surface of the display module for selecting one of the displayed objects, and a controller configured to execute an operation associated with the selected object according to which of the front and rear surface is touched.

According to one feature the operation associated with the selected object executes a function associated with the selected object when the front surface is touched. Additionally, the selected object executes a preview of information associated with the selected object when the rear surface is touched. Furthermore, the operation is set according to the type of object displayed on the display module. Finally, one or more additional operations are set according to the type of object displayed on the display module.

According to another feature, the controller activates a second menu in response to an input on the display module when the first menu is active. Additionally, the second menu is preset according to the location of the touch input. Furthermore, the controller controls the second menu to utilize information associated with the first menu.

According to yet another feature, the first menu and the second menu are layered, such that an active menu overlaps a nonactive menu. Additionally, the controller controls the active menu to be displayed relatively sharper than the nonactive menu.

According to still yet another feature, the controller deactivates the active menu to a nonactive state in response to the touch input on the front surface of the display module and activates the nonactive menu to an active state in response to a touch on the rear surface of the display module.

According to another embodiment, a method for controlling a mobile terminal is presented. The method includes displaying an object associated with a first menu on at least one of a front surface or a rear surface of a display module, receiving a touch input via the front and rear surface of the display module for selecting one of the displayed objects, and executing an operation associated with the selected object according to which of the front and rear surface is touched.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 19(a) and 19(b) illustrate a multitasking method using a touch input in a mobile terminal according to an embodiment of the present invention.

FIG. 20 illustrates a method for selecting a menu via a touch input in a mobile terminal according to another embodiment of the present invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Hereinafter, a mobile terminal relating to the present invention will be described below in more detail with reference to the accompanying drawings. In the following description, suffixes "module" and "unit" are given to components of the mobile terminal for the purpose of facilitating description and do not have meanings or functions discriminated from each other.

The mobile terminal described in the specification may include a cellular phone, a smart phone, a laptop computer, a digital broadcasting terminal, a personal digital assistant (PDA), a portable multimedia player (PMP), or a navigation system.

Figure 1:
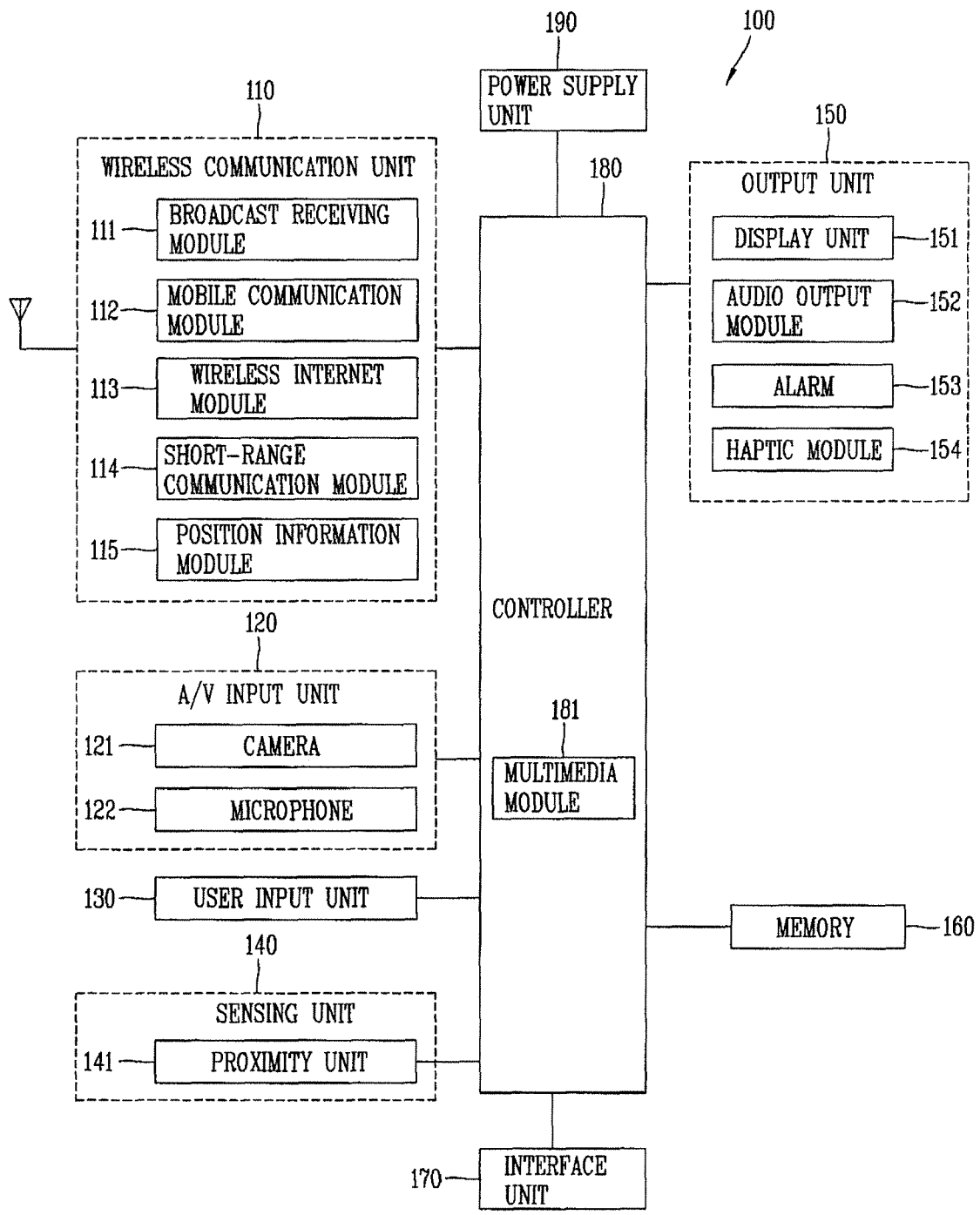
FIG. 1 is a block diagram illustrating a mobile terminal according to an embodiment of the present invention.

FIG. 1 illustrates a block diagram of a mobile terminal 100 according to an embodiment of the present invention. The mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. The components illustrated in FIG. 1 are not essential parts and the number of components included in the mobile terminal may vary.

The components of the mobile terminal will now be described in detail.

The wireless communication unit 10 may include at least one module that enables radio communication between the mobile terminal 100 and a radio communication system, or between the mobile terminal 100 and a network in which the mobile terminal 100 is located. For example, the radio communication unit 110 may include a broadcast receiving module 111, a mobile communication module 112, a wireless Internet module 113, a short-range communication module 114, and a position information module 115.

The broadcast receiving module 111 receives a broadcast signal and broadcast associated information from an external broadcast managing entity via a broadcast channel.

The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H). In this example, the broadcasting related information may be received by the mobile communication module 112.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module 111 may also receive multicast signals. Data received by the broadcast receiving module 111 may be stored in a suitable device, such as the memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal 100. The wireless Internet module 113 may be internally or externally coupled to the terminal 100. The wireless Internet techniques may include, but are not limited to, Wireless LAN (WLAN) (Wi-Fi), wireless broadband (Wibro), world interoperability for microwave access (Wimax), and high speed downlink packet access (HSDPA).

The short-range communication module 114 facilitates short-range communications. Suitable technologies for implementing the short-range communication module 114 include radio frequency identification (RFID), infrared data association (IrDA), ultra-wideband (UWB), as well at the networking technologies commonly referred to as Bluetooth™ and ZigBee™.

The position information module 115 identifies and obtains the location of the terminal 100. The position information module 115 may be implemented using global positioning system (GPS) components which cooperate with associated satellites and network components.

The audio/video (A/V) input unit 120 provides audio or video signal inputs to the terminal 100. The A/V input unit 120 may include a camera 121 and a microphone 122. The camera 121 receives and processes image frames of still pictures or video. The processed image frames or video may be displayed on a display unit 151.

The microphone 122 receives an external audio signal while the terminal 100 is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones 122 or cameras 121.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and close state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device. The sensing unit 140 may also include a proximity sensor.

The interface unit 170 may act as a passage for supplying the mobile terminal 100 with power from a cradle or delivering various command signals input from the cradle if the mobile terminal 110 is connected to an external cradle. Each of the various command signals input from the cradle or the power may operate as a signal enabling the mobile terminal 100 to recognize that it is correctly loaded in the cradle.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device. The touch screen may be in the form of a touch film, a touch sheet and a touch pad, for example.

The display 151 may be implemented using known display technologies such as a liquid crystal display (LCD), a thin film transistor-liquid crystal display (TFT-LCD), an organic light-emitting diode display (OLED), a flexible display, or a three-dimensional display.

The display unit may be of a transparent type or a light transmission type. The transparent display includes a transparent liquid crystal display. The rear structure of the display unit 151 may also be of the light transmission type. According to this structure, a user may see an object located behind the body of the mobile terminal 100 through an area of the body of the mobile terminal 100, which is occupied by the display unit 151.

The terminal 100 may include one or more displays 151. An example of a two-display embodiment is one in which one display 151 is configured as an internal display which is viewable when the terminal 100 is in an opened position and a second display configured as an external display which is viewable in both the open and closed positions.

The touch sensor may be constructed such that it converts a variation in pressure applied to a specific area of the display unit 151 or a variation in capacitance generated at a specific area of the display unit 151 into an electric input signal. The touch sensor may sense the pressure of a touch in addition to the position and area of a touch.

When an input is applied to the touch screen, a signal corresponding to the input is transmitted to a touch controller. The touch controller processes the signal and transmits data corresponding to the processed signal to the controller 180. Accordingly, the controller 180 may detect a touched area of the display 151.

The proximity sensor 141 may be provided within or around the touchscreen. The proximity sensor detects an object approaching a prescribed detecting surface or a presence or non-presence of an object existing around itself using electromagnetic power or infrared rays without mechanical contact.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, or an infrared proximity sensor.

A capacitive touch screen may be constructed such that proximity of a pointer may be detected via a variation in an electric field according to the proximity of the pointer. In this example, the touch screen may be classified as a proximity sensor.

For clarity and convenience of explanation, an action for enabling the pointer approaching the touchscreen to be recognized as placed on the touchscreen is referred to as a "proximity touch" and an action of enabling the pointer to actually come into contact with the touchscreen is referred to as a "contact touch". A "proximity touch point" refers to a point on the touch screen where the pointer perpendicularly corresponds with the touch screen.

The proximity sensor may sense a proximity touch pattern and a proximity touch action. For example, the proximity sensor may sense a proximity touch distance, a proximity touch direction, a proximity touch velocity, a proximity touch time, a proximity touch position, or a proximity touch moving state. Information associated with the sensed proximity touch action and proximity touch pattern may be displayed on the touch screen.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio relating to a particular function, such as a call notification, a message notification, or an error notification.

The output unit 150 is further shown having an alarm 153, which may be used to output a signal for indicating generation of an event of the mobile terminal 100. Examples of events generated in the mobile terminal include receiving a call signal, receiving a message, input of a key signal, or a touch input, for example.

The alarm 153 may output signals in forms different from video signals or audio signals, for example, a signal for indicating generation of an event via vibration. The video signals or the audio signals may be output via the display unit 151 or the audio output module 152.

The output unit 150 is further shown having a haptic module 154, which may generate various haptic effects such as a vibration. The haptic module may control the intensity and pattern of the generated vibration. For example, different vibrations may be combined and output or sequentially output.

The haptic module 154 may generate a variety of haptic effects, such as, the feeling of pins contacting a user's skin, a jet force or sucking force, rubbing a user's skin, a user's contact with an electrode, an electrostatic force, or variations in temperature.

The haptic module 154 may also allow a user to feel haptic effects via kinesthetic sense of the user's fingers or arms. The mobile terminal 100 may include more than one haptic module 154 according to the constitution of the mobile terminal.

The memory 160 may store various types of data to support the processing, control, or storage requirements of the terminal 100. Examples of such data include program instructions for applications operating on the terminal, contact data, phonebook data, messages, pictures, or video.

The memory 160 shown in FIG. 1 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device. The mobile terminal 100 may operate in relation to a web storage performing the storing function of the memory 160 on the Internet.

The interface unit 170 may be implemented to connect the terminal with an external device. External devices include wired and wireless headphones, external chargers, power supplies, storage devices configured to store data, or microphones. The interface unit 170 may be configured using a wired and wireless data port, a memory card socket, audio input and output ports (I/O), or video I/O ports. Additionally, the interface unit 170 may act as a passage for supplying the mobile terminal 100 with a power supply.

The interface unit 170 may also receive a user identification module (UIM). A UIM may include a chip that stores information for authenticating the authority to use the mobile terminal 100 and may include a subscriber identity module (SIM) and a universal subscriber identity module (USIM). A user identification module may be manufactured in the form of a smart card.

The controller 180 controls the overall operations of the terminal 100. For example, the controller 180 performs the control and processing associated with voice calls, data communications, video calls, camera operations, and recording operations.

The controller 180 may include a multimedia module 181 which provides multimedia playback. The multimedia module 181 may be configured as part of the controller 180 or may be implemented as a separate component.

Moreover, the controller 180 is able to perform a pattern recognizing process for recognizing a writing input and a picture drawing input carried out on the touchscreen as characters or images.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

Figure 2A:
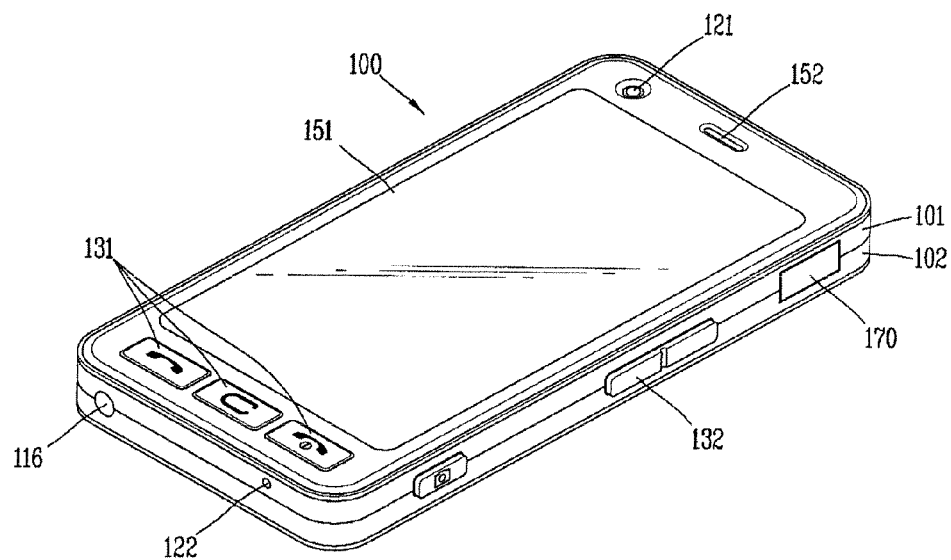
FIG. 2A is a front perspective view of a handheld terminal according to an embodiment of the present invention.

FIG. 2A illustrates a perspective view of a terminal 100 according to an embodiment of the present invention.

The terminal 100 may be implemented in a variety of different configurations. Examples of such configurations include folder-type, slide-type, bar-type, rotational-type, swing-type, and swivel-type terminals comprising at least two bodies that are relatively movably combined.

The terminal body includes a case, such as, a housing or a cover, forming the exterior of the terminal 100. In the present embodiment, the case may be divided into a front case 101 and a rear case 102. Various electronic components are arranged in the space formed between the front case 101 and the rear case 102. At least one middle case (not shown) may be additionally arranged between the front case 101 and the rear case 102.

The cases may be formed of plastics via injection molding or made of a metal material such as stainless steel (STS) or titanium (Ti).

The display unit 151, the audio output unit 152, the camera 121, the user input unit 130 (not shown), 131, and 132, the microphone 122, and the interface 170 may be arranged in the terminal body, specifically, in the front case 101.

The display unit 151 may be placed on the front case 101. The audio output unit 152 and the camera 121 may be placed in proximity to one end of the display unit 151, the user input unit 131 and the microphone 122 may be located at the end of the display unit 151 which is opposite to the audio output unit 152. The user input unit 132 and the interface unit 170 may be arranged on the sides of the front case 101 and the rear case 102.

The user input unit 130 may receive commands for controlling the operation of the handheld terminal 100 and may include a plurality of input units 131 and 132. A user may operate the input units 131 and 132 while having tactile feeling.

Input units 131 and 132 may receive various inputs. For example, the input unit 131 may receive commands such as start, stop, and scroll and the input unit 132 may receive commands for controlling the volume of a sound output from the audio output unit 152 or conversion of the display unit 151 to a touch recognition mode, for example.

Figure 2B:
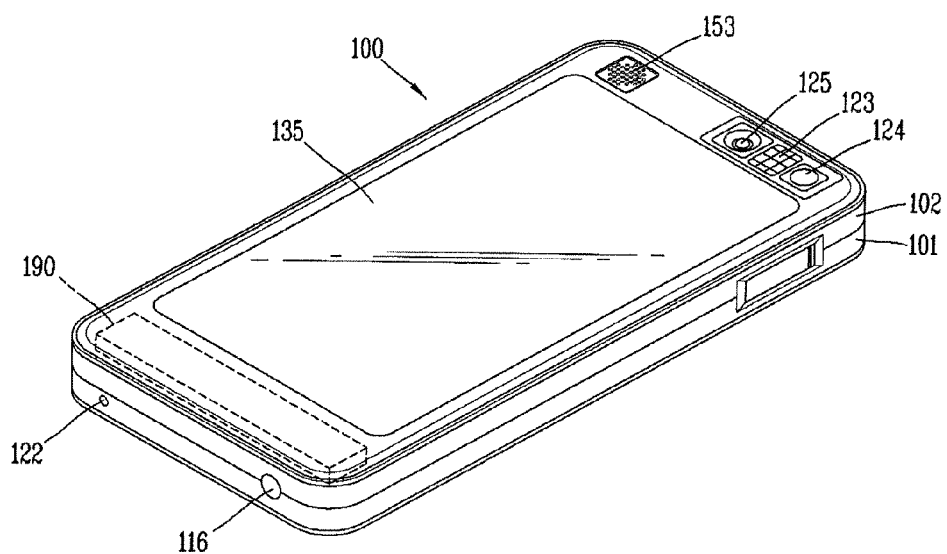
FIG. 2B is a rear perspective view of the handheld terminal shown in FIG. 2A according to an embodiment of the present invention.

FIG. 2B illustrates a rear perspective view of the handheld terminal shown in FIG. 2A according to an embodiment of the present invention.

As illustrated in FIG. 2A, a camera 125 may be additionally attached to the rear case 102. The camera 125 has a photographing direction opposite to that of the camera 121. The camera 121 of the front case 101 and camera 125 of the rear case 102 may have the same or different capabilities.

For example, the camera 121 may operate with a relatively lower resolution than the camera 125. Such an arrangement works well during a video conference in which reverse link bandwidth capabilities may be limited. The relatively higher resolution of the camera 125 of the rear case 102 is useful for obtaining higher quality pictures. The cameras 121 and 125 may be attached to the terminal body such that they may be rotated or popped-up.

A flash bulb 123 and a mirror 124 are additionally arranged in proximity to the camera 125. The flash bulb 123 may illuminate an object when the camera 125 takes a picture of the object. The mirror 124 is useful for assisting a user to position the camera 125 in a self-portrait mode.

The rear case 102 also includes an audio output module 153 configured as a speaker. The audio output module 152 of the front case 101 and the audio output module 153 of rear case 102 may cooperate to provide stereo output. Moreover, either or both of the audio output modules 152 and 153 may be configured to operate as a speakerphone.

A broadcasting signal receiving antenna 116 may be additionally attached to the side of the terminal body in addition to an antenna for telephone calls. The antenna 116 functions in cooperation with the broadcast receiving module 111. The antenna 116 may be fixed or configured to retract into the rear case 102.

The power supply 190 provides power to the terminal 100. The power supply 190 may be detachably mounted to the terminal.

A touch pad 135 may be additionally attached to the rear case 102. The touch pad 135 may be of a light transmission type similar to the display unit 151. For example, the touch pad 135 may simultaneously output information displayed on the display unit 151. Additionally, the information output via both sides of the display unit 151 may be controlled via the touch pad 135. Additionally, the touch pad 135 may display information which is different from the information displayed on the display unit 151.

The touch pad 135 may operate in connection with the display unit 151 of the front case 101. Additionally, the touch pad 135 may also be located in parallel with the display unit 151 or behind the display unit 151. Finally, the size of the touch panel 135 may be identical to or smaller than the display unit 151.

Figure 3A:
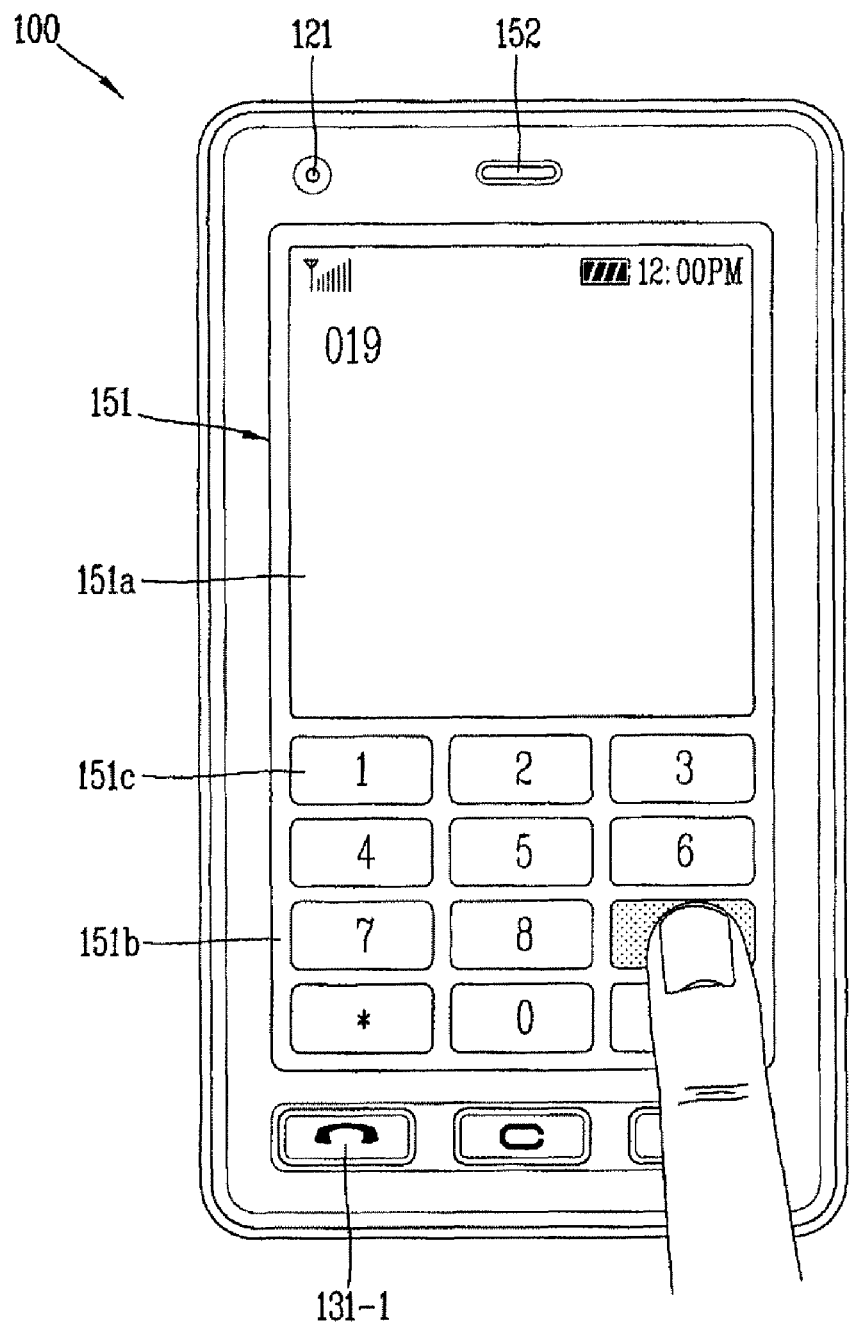
FIGS. 3A and 3B are front views of a handheld terminal for explaining an operation of the handheld terminal according to an embodiment of the present invention.
Figure 3B:
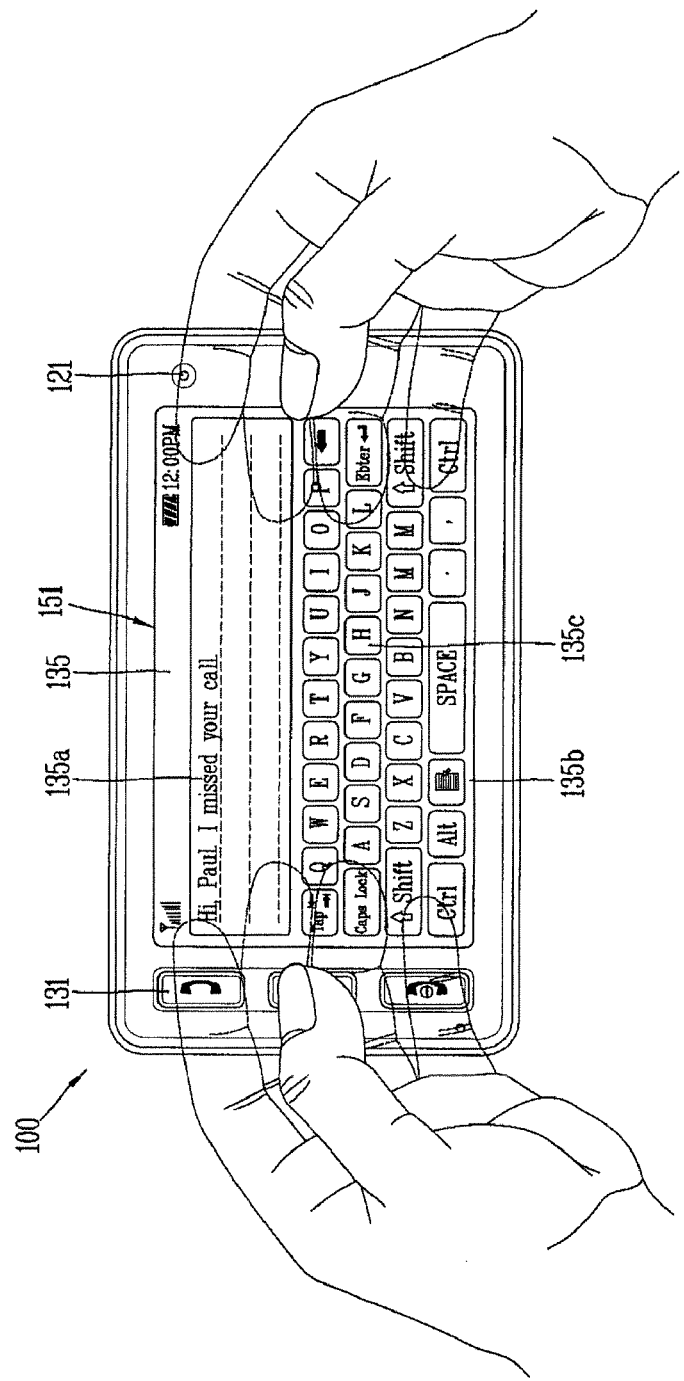

The operations of the display unit 151 and the touch pad 135 will now be described with reference to FIGS. 3A and 3B. FIGS. 3A and 3B illustrate front views of the terminal 100 according to an embodiment of the present invention.

The display unit 151 may display various types of visual information in the form of characters, numerals, symbols, graphics, or icons. At least one of the characters, numerals, symbols, graphic, or icons may be displayed in a predetermined arrangement, such as a keypad. The keypad displayed on the display unit 151 may be referred to as a "soft key".

FIG. 3A illustrates that touch applied to a soft key is input via the front side of the terminal body. The display unit 151 may be operated via the entire display area. Alternatively, the display unit 151 may be divided into a plurality of regions. Additionally, the display unit 151 may be constructed such that the plurality of regions interoperate.

For example, an output window 151a and an input window 151b may be, respectively, displayed in upper and lower parts of the display unit 151. The input window 151b may display soft keys 151c that represent numerals used to input numbers such as telephone numbers. A numeral corresponding to the touched soft key is displayed on the output window 151a when a soft key 151c is touched. Additionally, a connection for a call corresponding to a telephone number displayed on the output window 151a is attempted when the user operates the input unit 131-1.

FIG. 3B illustrates a user input via the touch pad 135 located on the rear side of the terminal body. FIG. 3B illustrates a landscape orientation of the terminal body while FIG. 3A illustrates a portrait orientation of the terminal body. The display unit 151 may be constructed such that an output image is converted according to the direction in which the terminal body is located.

FIG. 3B illustrates the operation of the handheld terminal in a text input mode. The display unit 151 displays an output window 135a and an input window 135b. A plurality of soft keys 135c may display at least one of characters, symbols, and numerals. The soft keys 135c may be displayed in the input window 135b. The soft keys 135c may be arranged in the form of "QWERTY" keys.

Characters, numerals, and symbols corresponding to the soft keys 135c are displayed on the output window 135a when a portion of the touch pad 135 corresponding to a soft key 135c is touch. Touch input via the touch pad 135 on the rear side of the terminal body allows for the soft keys 135c to have a greater visibility on the front side of the terminal body as compared to touch input via the display unit 151. For example, objects located behind the terminal body may be viewed with the naked eye, and thus touch input may be performed more correctly when the display unit 151 and the touch pad 135 are transparent.

The display unit 151 or the touch pad 135 may be constructed such that touch input may be received via a scroll input. The user may scroll the display unit 151 or the touch pad 135 to move an object displayed on the display unit 151, for example, a cursor or a pointer located on an icon. Furthermore, the finger moving path may be visually displayed on the display unit 151 when a finger moves on the display unit 151 or the touch pad 135.

A specific function of the terminal may be executed if the display unit 151 and the touch pad 135 are simultaneously touched for a predetermined period of time. The specific function may include activation or inactivation of the display unit 151 or the touch pad 135, for example.

Figure 4:
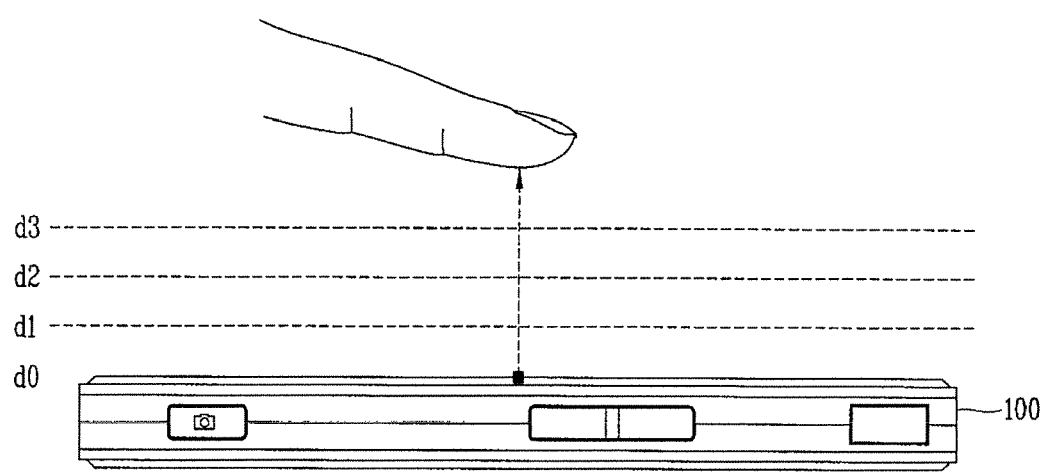
FIG. 4 illustrates an example of a proximity depth of a proximity sensor according to an embodiment of the present invention.

The proximity sensor described with reference to FIG. 1 will now be explained in more detail with reference to FIG. 4. FIG. 4 illustrates a conceptual view for a proximity depth of the proximity sensor.

As shown in FIG. 4, when a pointer such as a user's finger approaches the touch screen, the proximity sensor senses the approach and may output a proximity signal.

The proximity sensor may be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth may be known by using a plurality of proximity sensors having different detection distances and comparing proximity signals respectively output from the proximity sensors.

FIG. 4 shows the section of the touch screen in which proximity sensors may sense three proximity depths. Proximity sensors may be capable of sensing various levels of proximity depths, such as less than three or greater than four.

Specifically, a pointer is recognized as a contact touch when the pointer comes into contact with the touch screen (D0). The pointer is recognized as a proximity touch of a first proximity depth when the pointer is located within a distance D1 from the touch screen. The pointer is recognized as a proximity touch of a second proximity depth when the pointer is located in a range between the distance D1 and a distance D2 from the touch screen. The pointer is recognized as a proximity touch of a third proximity depth when the pointer is located in a range between the distance D2 and a distance D3 from the touch screen. The pointer is recognized as a canceled proximity touch when the pointer is located beyond the distance D3 from the touch screen.

Accordingly, the controller 180 may recognize the proximity touch as various input signals according to the proximity distance and the proximity position of the pointer with respect to the touch screen. The controller 180 may perform various operation controls according to the input signals.

Figure 5:
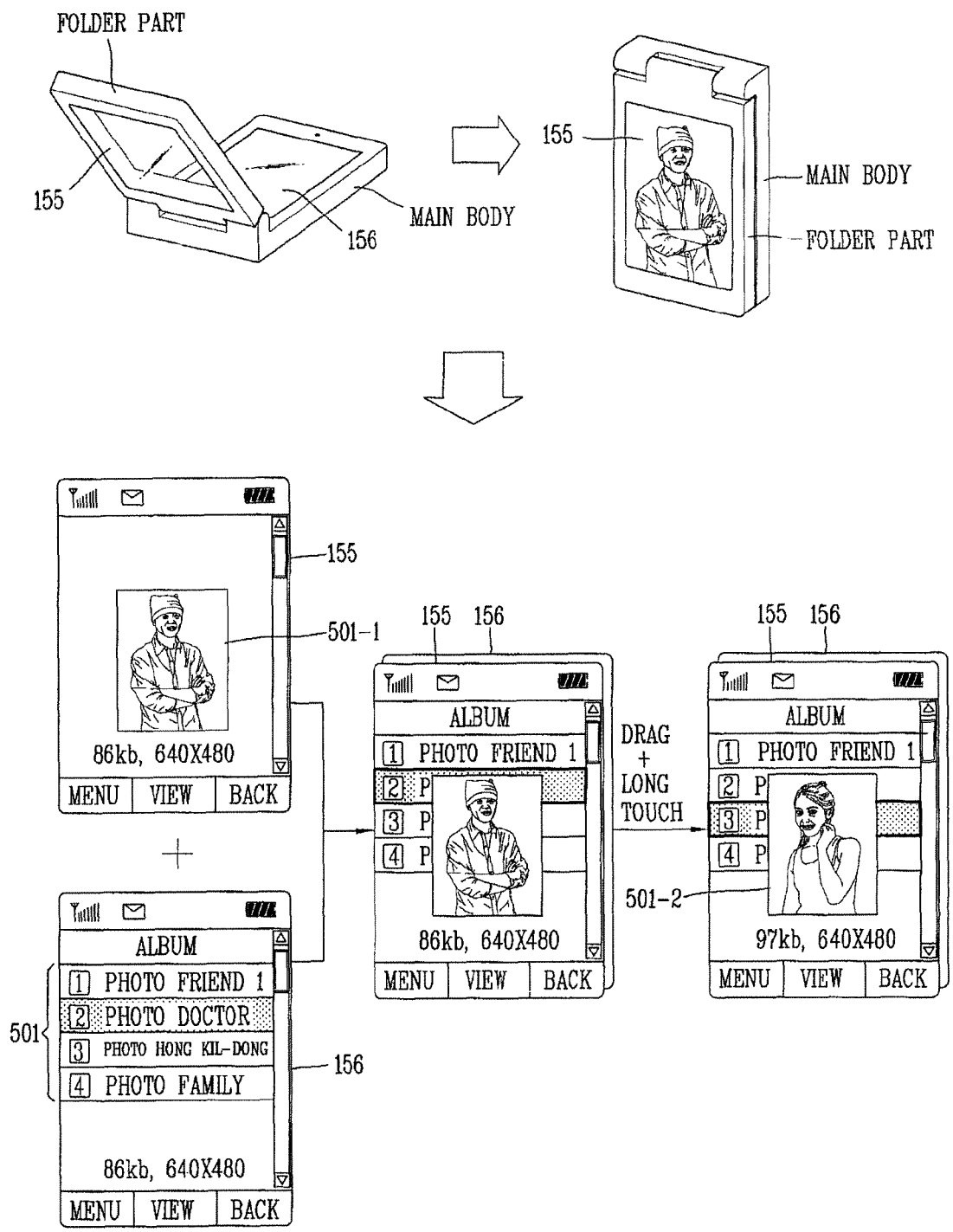
FIG. 5 illustrates a control method for a touching operation when a pair of displays are overlapped according to an embodiment of the present invention.

FIG. 5 illustrates an exemplary view of a method for controlling a touching operation in a pair of overlapped displays 155 and 156.

A mobile terminal disclosed in FIG. 5 is a folder type mobile terminal having a first portion which may be foldable with respect to a main body. A first display 155 mounted at the first portion may be light-transmittable or transparent, such as TOLED, additionally, a second display 156 mounted at the main body may be non-transmittable, such as LCD. The first and second displays 155 and 156 may be implemented as a touch screen. A rear side of the main body may include a touch pad for receiving a touch input in connection with the second display 156.

For example, the controller 180 may control the mobile terminal 100 to select an object displayed on the first display 155 or execute a function associated with the object if a touch is detected on the first display 155. The controller 180 may control the object selection and function execution according to a touch type or a touch duration. The touch refers to a proximity touch or a direct touch operation.

A method for controlling information displayed on a second display 156 after touching the first display 155 exposed in an overlapped state will be described according to various touch patterns.

In the overlapped state, such as if the mobile terminal is closed, the first display 155 overlaps the second display 156. In the overlapped state, if a second touch is detected, the controller 180 may control the mobile terminal 100 to select at least one image displayed on the second display 156 according to the detected touch input. The image selection may be displayed on the first display 155. The second touch refers to a touch which may be different from the first touch detected on the first display 155. For example if the first touch is a direct touch, then the second touch may be an extended touch which is a direct touch maintained for a predetermined time.

The extended touch may be used when selectively moving a desired object displayed on the second display 156 to the first display 155. If a user performs an extended touch on one portion of the first display 155 corresponding to a specific object, the controller 180 allows the corresponding object to be displayed on the first display 155. Additionally, the object displayed on the first display 155 may be moved to the second display 156 to be displayed thereon. FIG. 5 illustrates that a menu 501 displayed on the second display 156 is displayed on the first display 155.

When a combination of a drag and an extended touch are detected, the controller 180 may perform a specific function if a drag is detected with an extended touch. For example, if an extended touch is performed on the second display 156 via the touchpad on the rear side of the main body, and a drag operation is performed on the first display 155, a function related to the touched object of the second display 156 may be performed on the first display 155.

As illustrated in FIG. 5, the user has performed an extended touch on item 2 of the menu 501 displayed on the second display 156. Additionally, the user has performed a drag operation on the first display 155, thus, the preview image 501-1 may be displayed on the first display 155. Additionally, the menu 501 may also be displayed on the first display 155. While the menu 501 and the preview image 501-1 are simultaneously displayed on the first display 155, the user may drag to a second menu item of the menu 501, such as item 3, displayed on the first display 155, while maintaining the extended touch on the second display 156 via the touchpad on the rear side of the main body. The controller 180 may then move the cursor to menu item 3 and display a second preview image 501-2, associated with menu item 3, on the first display 155. Finally, if the extended touch is released, the first display 155 displays the original preview image 501-1.

The functions associated with the extended touch and drag operation discussed above may also be performed via an extended proximity touch and proximity drag operation.

The method for controlling the mobile terminal in an overlapped state may be applied to a terminal including a single display. Alternatively, such method may be applied to other terminals having a dual display which are not folder type terminals.

Hereinafter, the preferred embodiments of a control method, will be described with reference to the accompanying drawings. The embodiments may be implemented independently or in combination. Also, the embodiments may be used in combination with a user interface (UI) to be described later.

Mobile terminals including a transparent display module according to the present invention may be classified, according to the configuration of the display module. For example, the mobile terminal may be classified as a mobile terminal having a dual display module and a mobile terminal having a single display.

The terminal with the single display may denote a terminal having one transparent display, or a terminal with one display module configured by overlapping the transparent display with a non-transparent display. Also, the terminal with the dual display module may denote a terminal having each of the transparent display and a non-transparent display.

The dual display terminal and the single display terminal may be applied to various types of terminals, including a folder type, a flip type, a slide type, a bar type, a rotational type (swivel or swing), or a watch type.

Hereinafter, it will be assumed that a transparent display module may be touched on two opposite-facing surfaces. A touch pad may be attached onto both surfaces of the transparent display for a bilateral touch. For the ease of explanation, a surface facing a user, may be referred to as a front surface, and the opposite surface may be referred to as a rear surface.

Figure 6:
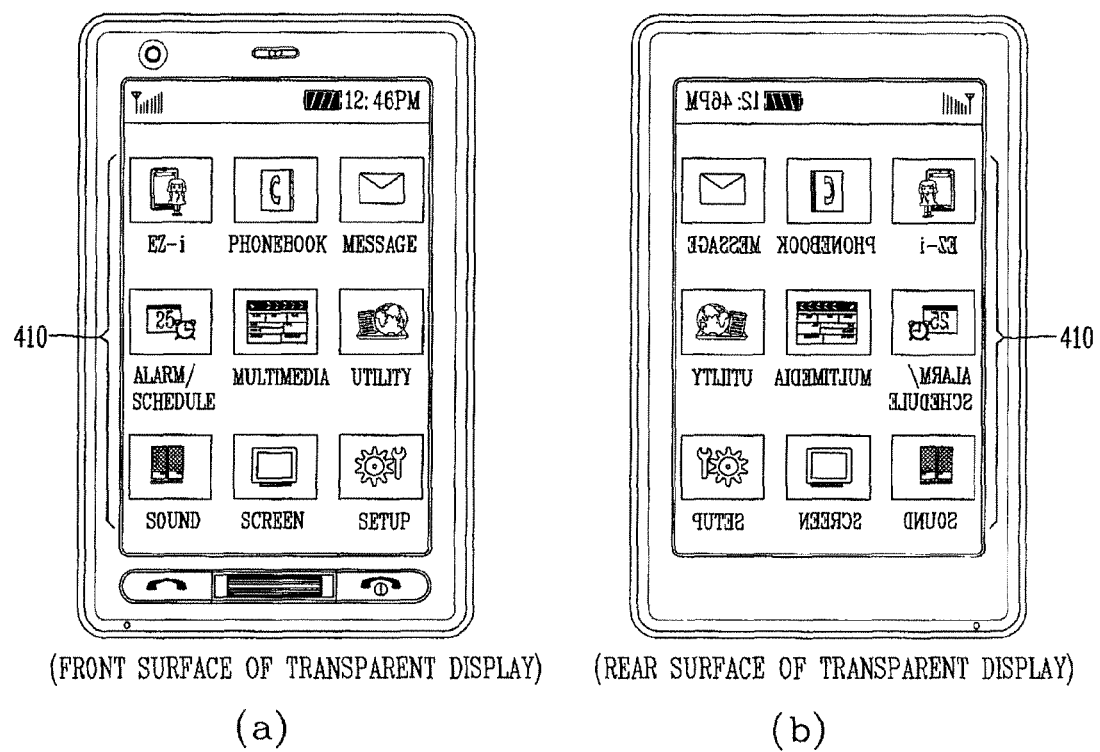
FIG. 6 illustrates a method for selecting and executing an object according to an embodiment of the present invention.

FIG. 6 is an exemplary view of a method for selecting and executing an object in a mobile terminal according to the present invention. FIG. 6(a) illustrates the front surface of the transparent display module, and FIG. 6(b) illustrates the rear surface of the transparent display module.

The transparent display module may display specific objects 410 associated with a menu. For example, the specific objects 410 may include menu icons, menu items, or contents items, comprising images and text.

A user may select at least one of the specific objects 410 via a touch operation. For example, an object may be selected when a touch is executed, and the function associated with the object may be executed when the touch is released. Alternatively, an object may be selected when a touch is executed, and the function associated with the object may be executed when a second touch is performed.

In general, when selecting an object or executing a function via a touch operation, a function associated with an object may be inadvertently executed. Specifically, a touch error may occur due to a minor inaccuracy in the user's touch operation, whereby an undesired operation may be executed.

However, the mobile terminal according to the present invention may separate the selection and execution functions of an object according to the surface where a touch is input, thereby preventing such touch error. Specifically, when a specific object displayed on a transparent display is touched on the front surface, a first operation may be executed. Additionally, when the same object is touched on the rear surface, a second operation may be executed.

The first and second operations may be modified according to the type of object selected. Also, the first and second operations may be modified according to the active menu. For example, if the displayed object is a multimedia file, such as a still image, video, or music, the controller 180 may execute the multimedia file when a user touches the multimedia file on the front surface. Additionally, the controller 180 may display information, such as a preview screen, a song preview, or additional information, related to the multimedia file when the user touches the multimedia file on the rear surface.

Accordingly, the operation of executing the multimedia file may refer to the first operation, and the operation of displaying the information related to the multimedia file may refer to the second operation. Thus, the same object may execute different functions according to the touched surface of the display module, thereby preventing the touch error.

Figure 7:
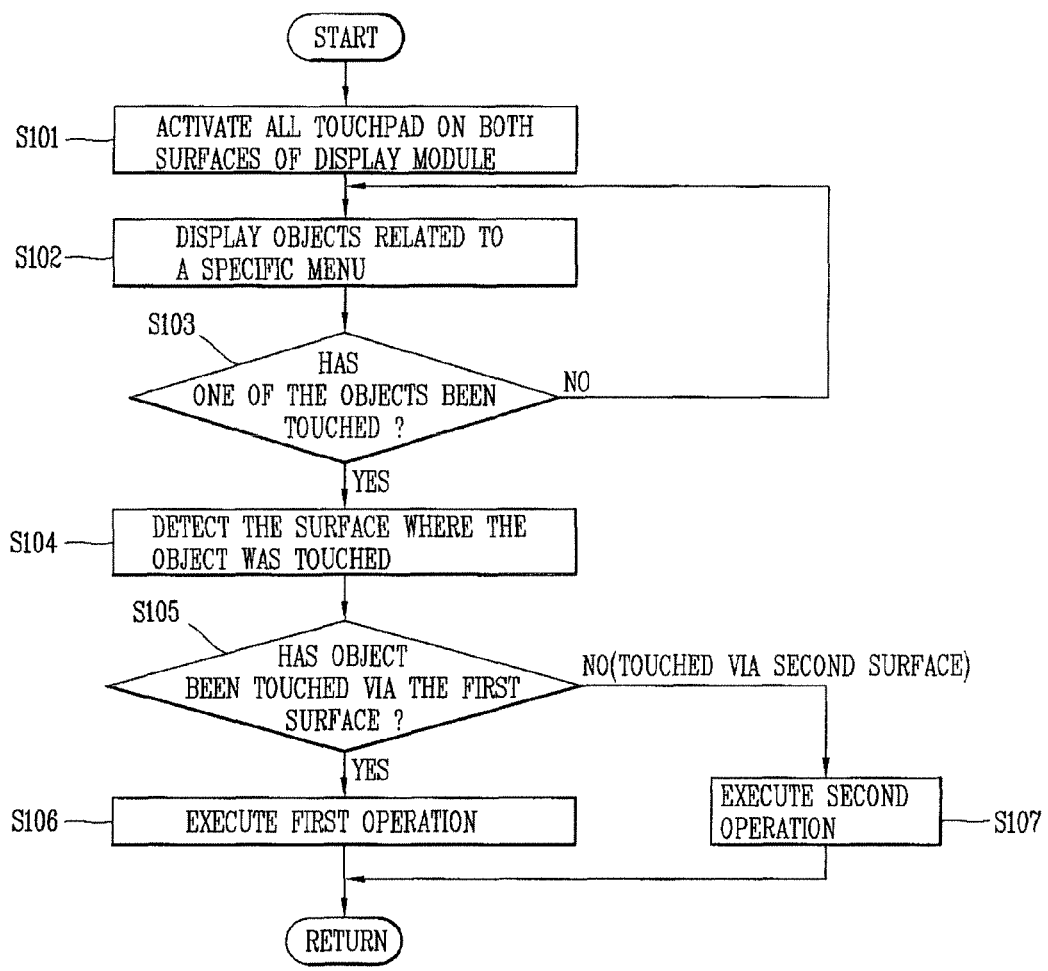
FIG. 7 is a flowchart illustrating a method for selecting and executing an object of a mobile terminal according to an embodiment of the present invention.

FIG. 7 is a flowchart showing a method for selecting and executing an object in a mobile terminal according to an embodiment of the present invention.

According to a preset environment setup option (not shown), the controller 180 may selectively activate each touchpad disposed on both surfaces of the transparent display module. Specifically, one of the touch pads may be activated or both touch pads may be activated.

Hereinafter, it is assumed that both touch pads are activated (S101). When a user runs a specific menu, the controller 180 displays various submenu items on an execution screen of the specific menu. Hereinafter, the submenu items are referred to as objects. Thus, the controller 180 displays objects related to the specific menu (S102).

When the user touches one of the displayed objects (S103), the controller 180 detects the surface where the object was touched (SI04). If the object is touched on a first surface, such as the front surface (S 105), the controller 180 executes a first operation (S106). If the object is touched on a second surface, such as the rear surface, the controller 180 executes a second operation (S107). The first and second operations may be preset by the user or the manufacturer.

Hereinafter, the first and second operations will be described according to various embodiments.

Figure 8:
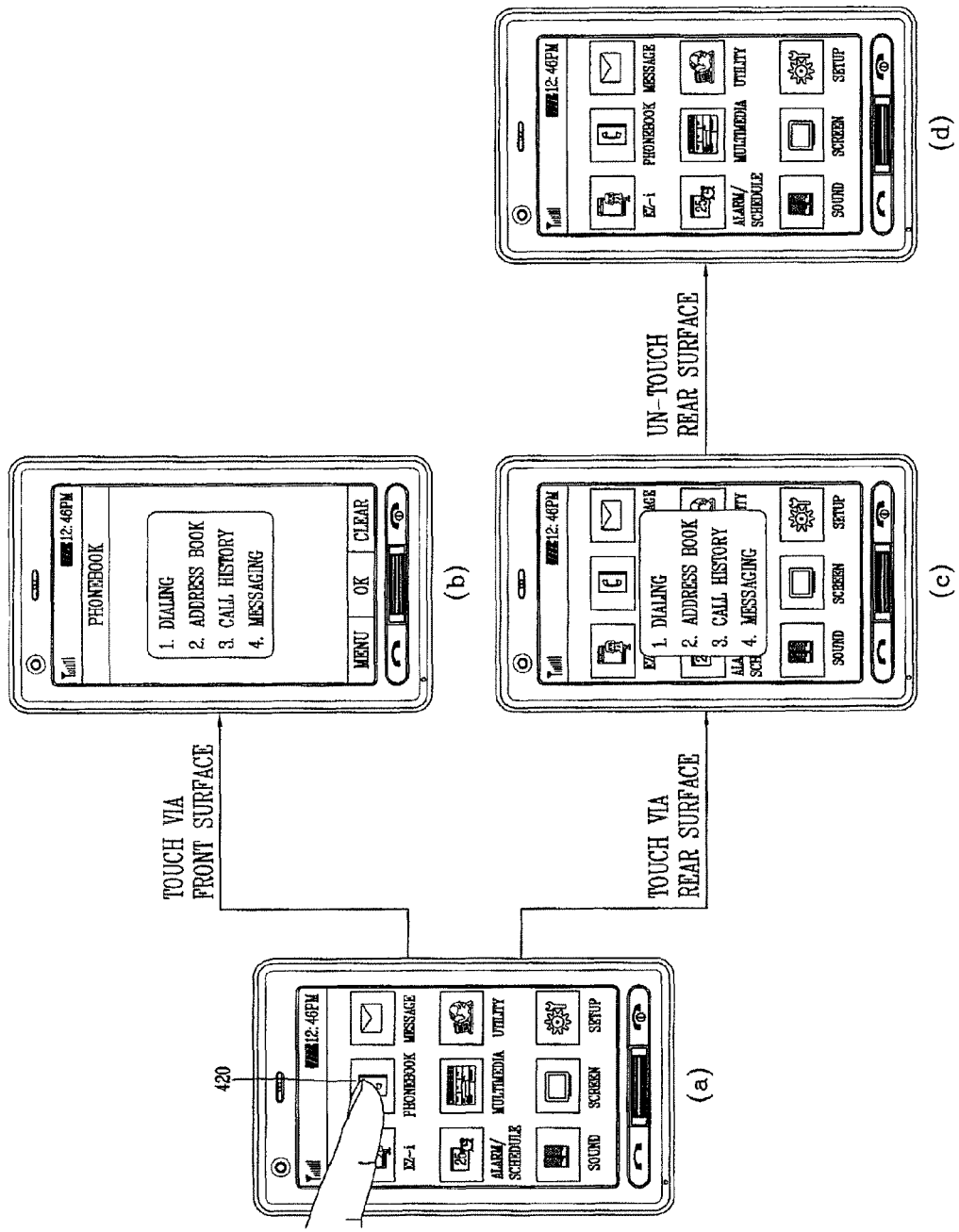
FIG. 8 illustrates a method for selecting and executing an object via a touch input according to an embodiment of the present invention.

FIG. 8 illustrates a method for selecting an object and executing a function associated with the object in a mobile terminal according to an embodiment of the present invention.

FIG. 8(a) illustrates a main menu screen displayed on the front surface, FIG. 8(b) illustrates the front surface when a specific object is touched on the front surface. FIG. 8(c) illustrates the front surface when the specific object is touched on the rear surface.

For example, if a specific object 420, such as a phonebook menu item, of FIG. 8(a) is touched at the front surface, the controller 180 may display, as shown in FIG. 8(b), a submenu of the specific object 420. The controller 180 may continue to display the submenu of the specific object 420 after the touch operation on the front surface has been executed.

If the specific object is touched at the rear surface, the controller 180 may display, as shown in FIG. 8(c), the submenu of the specific object 420 as a preview screen. The preview screen may be displayed as a pop-up window. The controller 180 displays the main menu screen as shown in FIG. 8(d) when the touch operation on the rear surface has terminated.

As discussed above, the first operation refers to the display of the submenu when the specific object 420 is selected via the front surface, and the second operation refers to the display of the submenu when the specific object 420 is selected via the rear surface.

Figure 9:
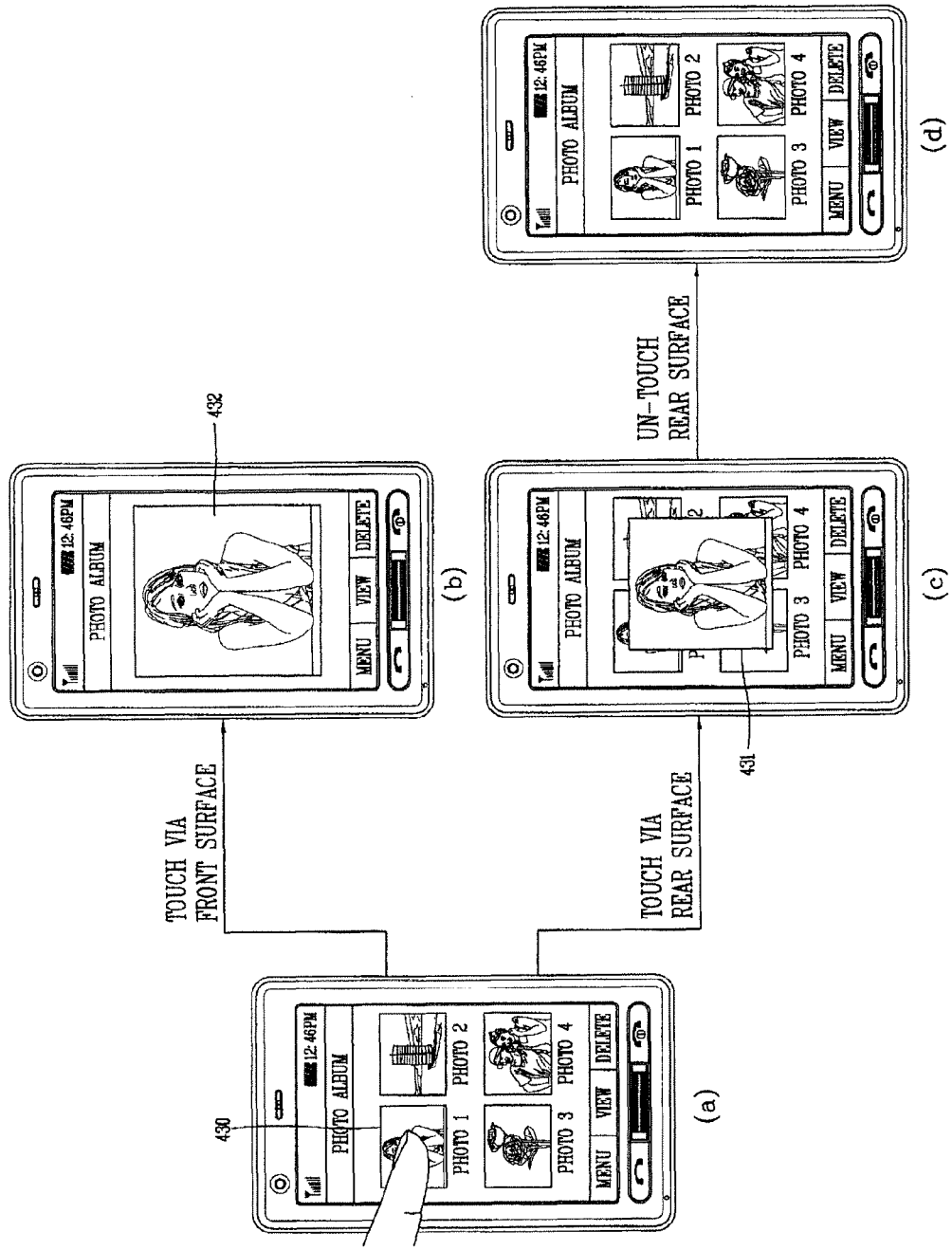
FIG. 9 illustrates a method for selecting and executing an object of a mobile terminal according to another embodiment of the present invention.

FIG. 9 illustrates a method for selecting an object and executing a function associated with the object in a mobile terminal according to another embodiment of the present invention.

FIG. 9(a) illustrates a photo album displayed on the front surface, FIG. 9(b) illustrates a screen viewed on the front surface when a specific object 430, such as a thumbnail item, is touched at the front surface, and FIG. 9(c) illustrates a screen viewed on the front surface when the specific object 430 is touched at the rear surface.

When a specific object 430, as displayed in FIG. 9(a), is touched via the front surface, the controller 180 may display the full size image 432 of the specific object 430 on the entire screen as shown in FIG. 8(b). The full size image 432 may be displayed on the screen after the touch operation has been executed.

When the specific object is touched at the rear surface, the controller 180 may display, as shown in FIG. 9(c), a preview screen 431 of the specific object 430. The controller 180 displays the main menu screen as shown in FIG. 9(d) when the touch operation on the rear surface has terminated.

According to the embodiment described above, the first operation refers to the display of the full size image 432 when the specific object 430 is selected via the front surface, and the second operation refers to the display of the preview image 431 when the specific object 430 is selected via the rear surface.

Figure 10:
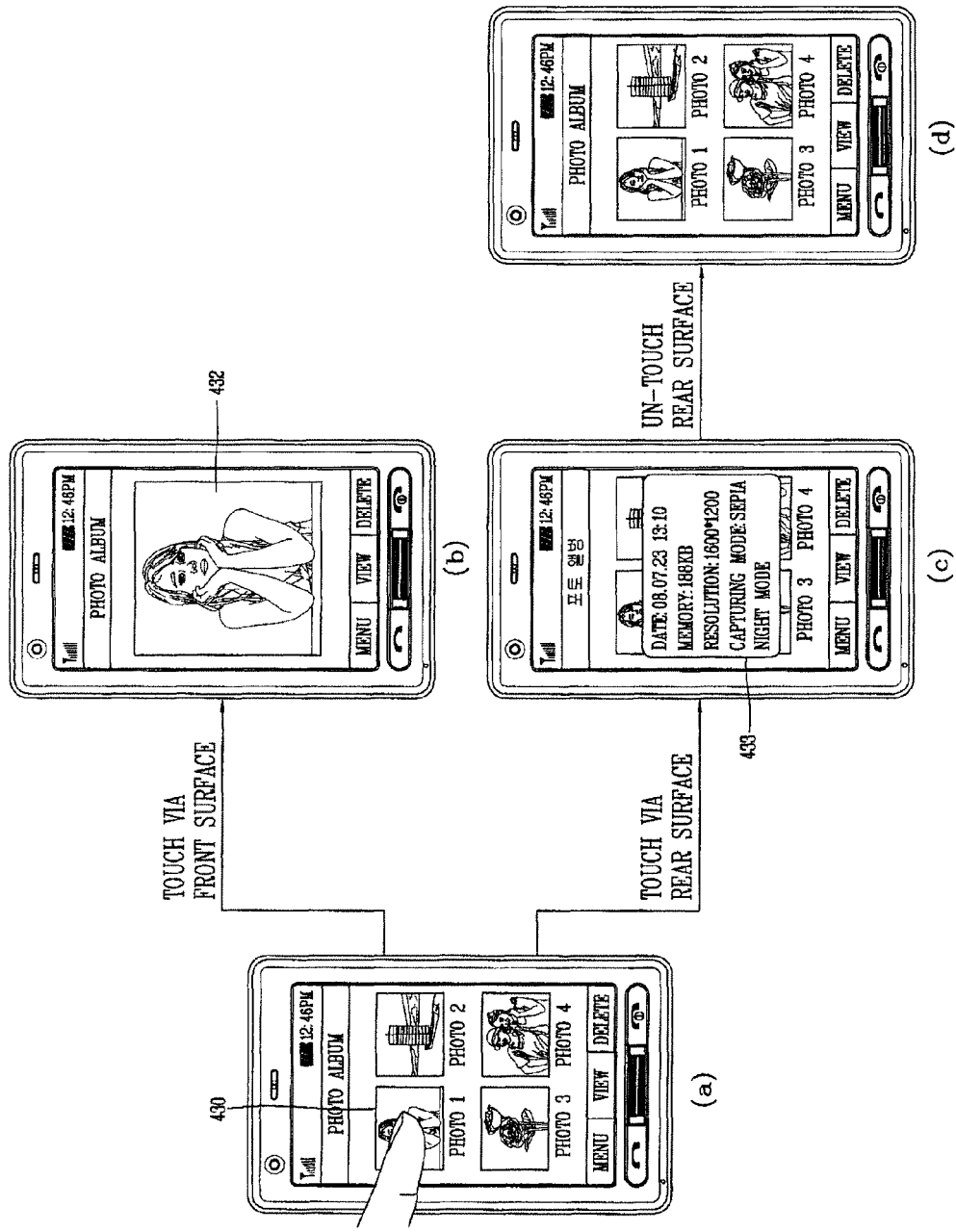
FIG. 10 illustrates another operation executed according to a method of touching an object illustrated in FIG. 9.

FIG. 10 illustrates another operation executed according to the method of touching an object according to the embodiment illustrated in FIG. 9.

The controller 180 displays the full size image 432 of the specific object 430 on the front surface, as shown in FIG. 10(b), if the specific object 430 of FIG. 10(a) is touched at the front surface. The full size image 432 may be displayed on the screen after the touch operation has been executed.

If the specific object 430 is touched at the rear surface, the controller 180 displays, as shown in FIG. 10(c), additional information 433, such as photo name, capturing date, file size, and capturing mode, related to the specific object 430. The controller 180 displays the main menu screen as shown in FIG. 0(d) when the touch operation on the rear surface has terminated.

As disclosed with respect to FIGS. 9 and 10, various operations may be associated with the specific object displayed in a menu of the mobile terminal 100. Thus, even if the same menu or the same object associated with the menu is touched on the same surface, a different operation may be executed according to a preset environment setup.

Figure 11:
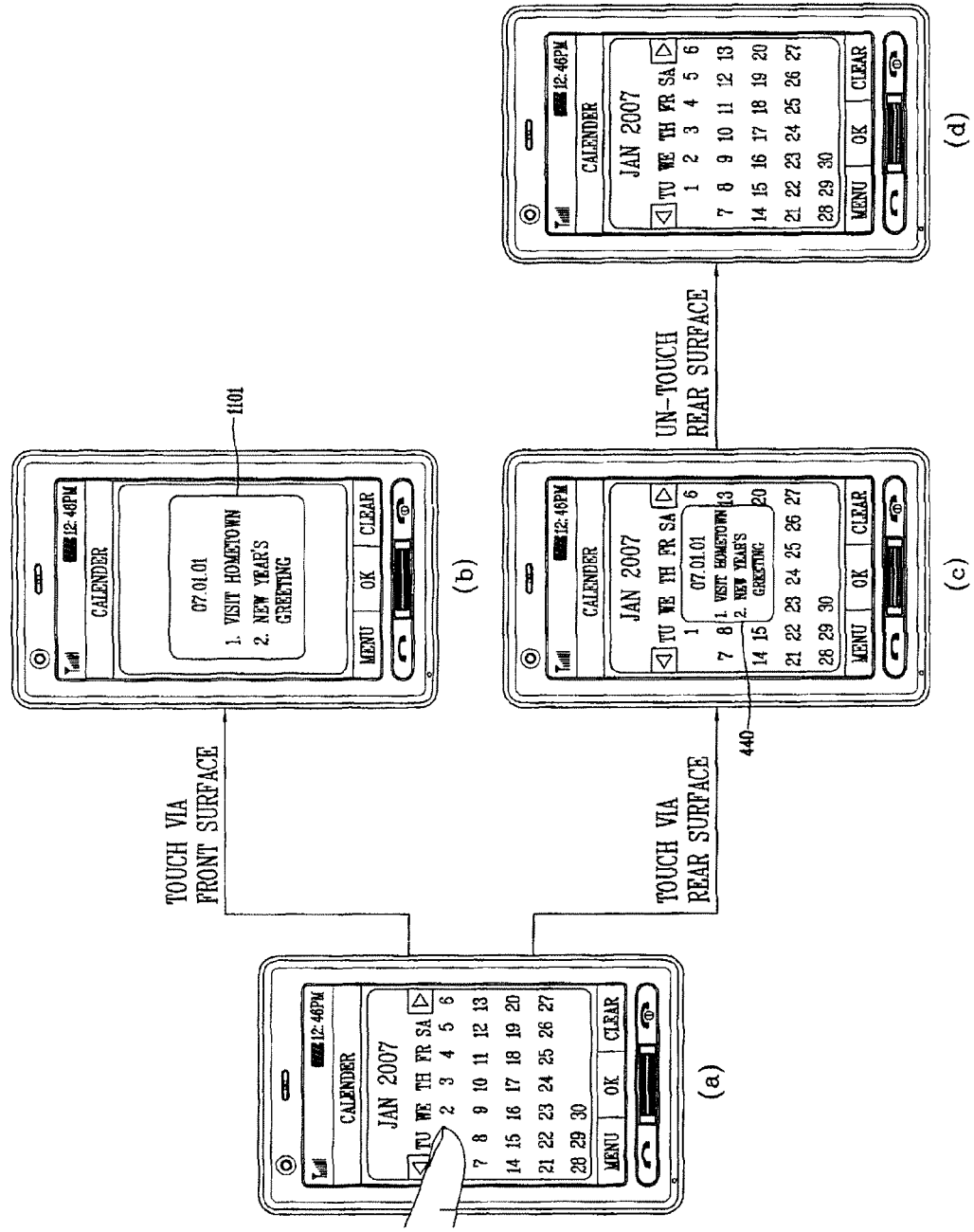
FIG. 11 illustrates a method for selecting and executing an object of a mobile terminal according to another embodiment of the present invention.

FIG. 11 illustrates a method for selecting an object and executing a function associated with the object in a mobile terminal according to another embodiment of the present invention.

FIG. 11(a) illustrates a calendar function displayed on the front surface, FIG. 11(b) illustrates a screen of the front surface when a specific object, such as a date, is touched via the front surface, and FIG. 11(c) illustrates a screen of the front surface when the specific object is touched via the rear surface.

When the specific object, such as a date, shown in FIG. 11(a), is touched via the front surface, the controller 180 enters a calendar edit mode 1101 associated with the selected object (FIG. 11(b)). The calendar edit mode may allow the user to add events to a specific date (not shown), or display events scheduled for a specific date. The calendar edit mode 1101 may be displayed on the screen after the touch operation has been executed.

Additionally, if the specific object is touched via the rear surface, the controller 180 displays, as shown in FIG. 11(c), the schedule set for the specific object on a preview screen 440. The controller 180 may display the main menu screen as shown in FIG. 11(d) when the touch operation on the rear surface has terminated.

In the embodiment discussed with respect to FIG. 11, the first operation refers to the operation of entering the calendar edit mode 1101, and the second operation corresponds to the operation of displaying a preview screen of the schedule for the selected date.

Figure 12:
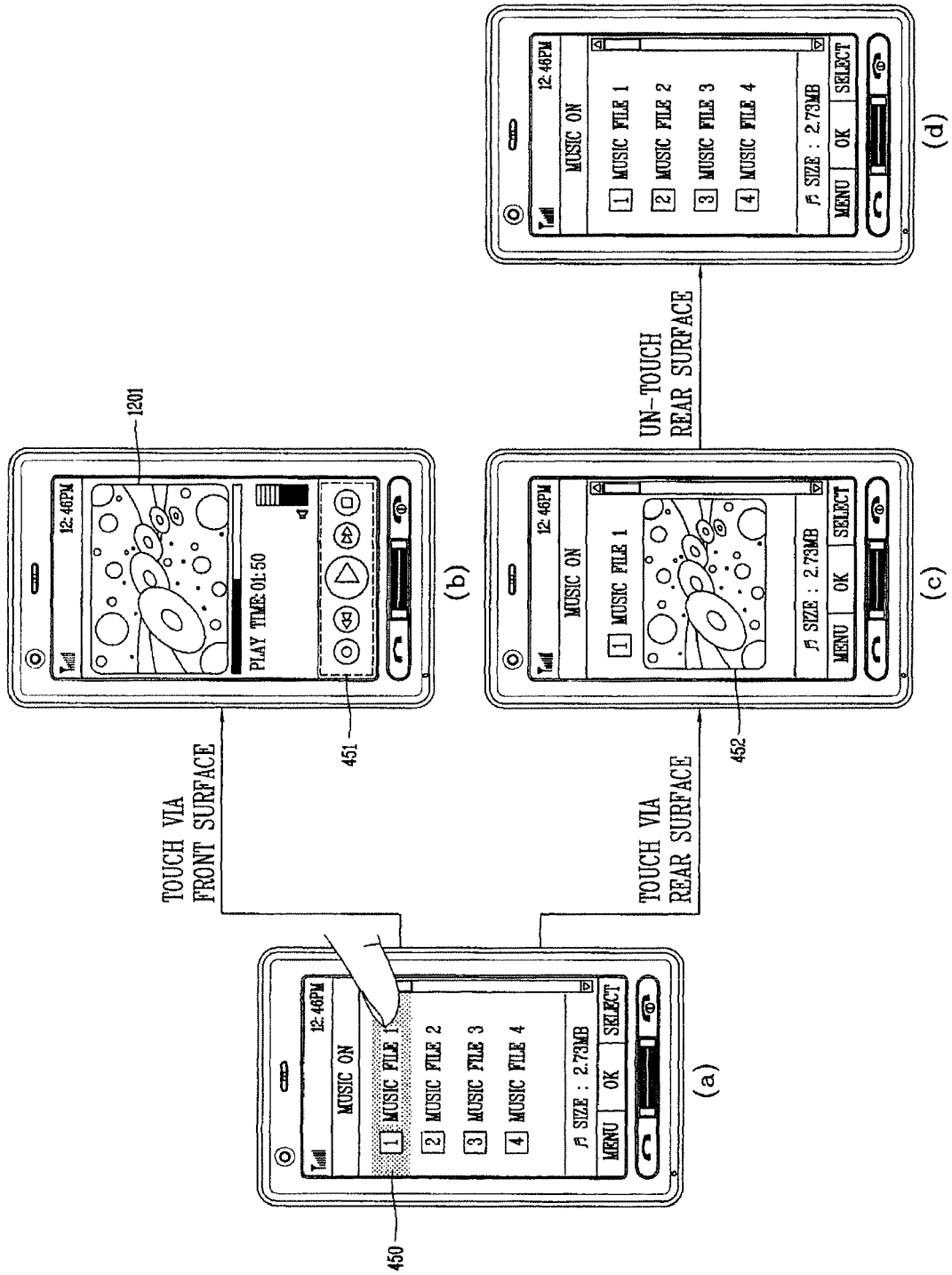
FIG. 12 illustrates a method for selecting and executing an object of a mobile terminal according to another embodiment of the present invention.

FIG. 12 illustrates a method for selecting an object and executing a function associated with the object in a mobile terminal according to another embodiment of the present invention.

FIG. 12(a) illustrates a multimedia file list screen displayed on the front surface, FIG. 12(b) illustrates a screen viewed on the front surface when a specific object, such as a multimedia file, is touched on the front surface, and FIG. 12(c) illustrates a screen viewed on the front surface when the specific object is touched on the rear surface.

When a specific object 450, as illustrated in FIG. 12(a), is touched on the front surface, the controller 180 displays a reproduction screen for the specific object 450 (FIG. 12(b)). The reproduction information screen 1201 may include a plurality of control buttons 451, such as stop, rewind, forward, volume, and file open. The reproduction information screen 1201 and the control buttons 451 may be displayed on the screen after the touch operation has been executed.

Additionally, if the specific object is touched on the rear surface, the controller 180 displays a preview reproduction screen 452 for the specific object as shown in FIG. 12(c). The preview reproduction screen may be adjusted according to the selected object. For example, if the type of multimedia file is a music file, music is played, and if the type of multimedia file is a video file, video and sound are output. The preview reproduction screen 452 may not include any control button. Alternately, the preview reproduction screen 452 may include a simple display including several control buttons and a state bar indicating a reproduction state. The controller 180 may display the main menu screen as shown in FIG. 12(d) when the touch operation on the rear surface has terminated.

In the embodiment described with respect to FIG. 12, the first operation refers to an operation of displaying the reproduction information screen 1201 including control buttons 451 for reproducing multimedia files and controlling the reproduction, and the second operation refers to the operation of displaying the preview reproduction screen 452.

Figure 13:
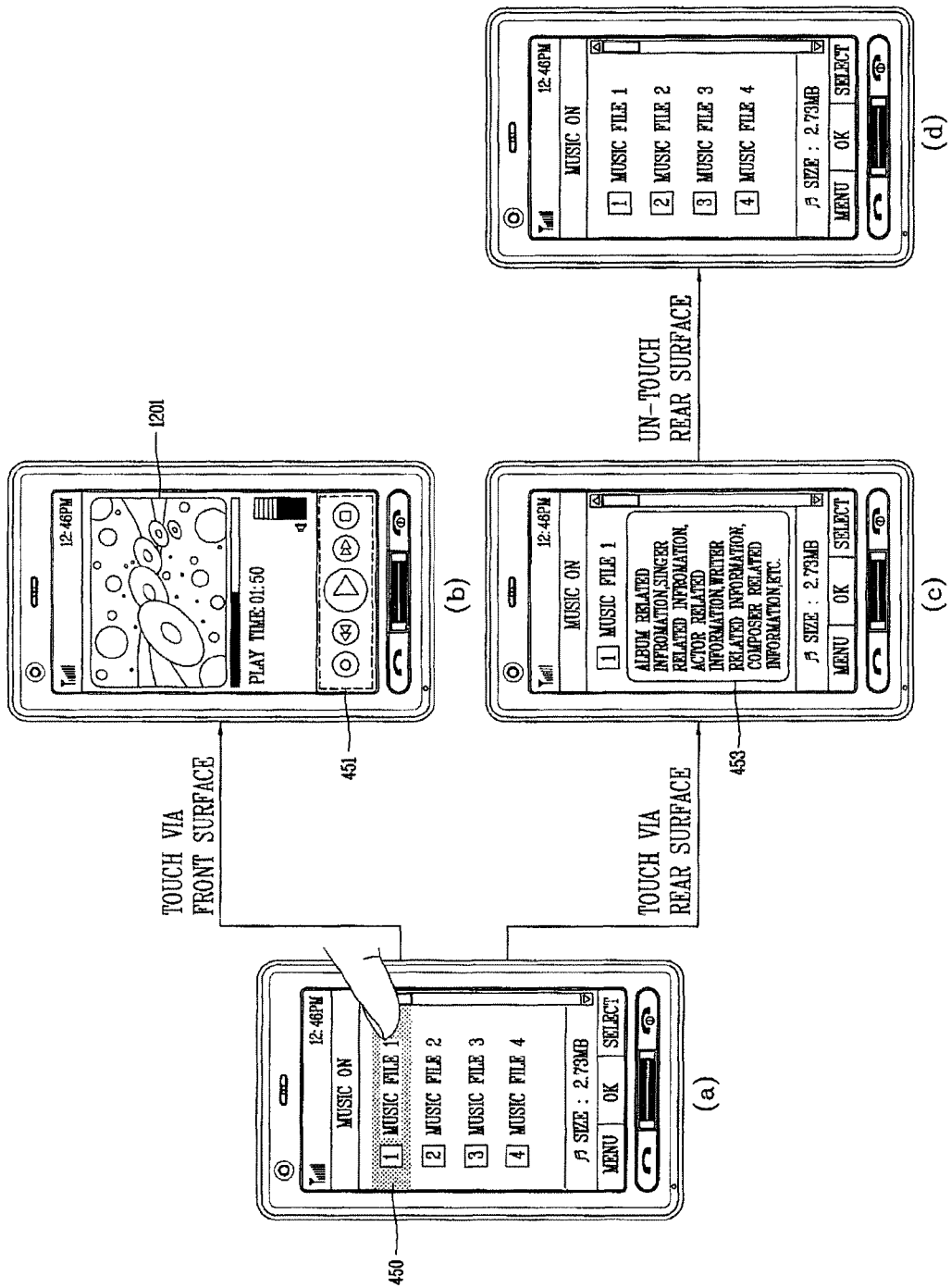
FIG. 13 illustrates another operation executed according to a method of touching an object illustrated in FIG. 12.

FIG. 13 illustrates another operation executed according to a method of touching an object in the embodiment of FIG. 12.

As illustrated in FIG. 13(a), if a specific object 450 is touched on the front surface, the controller 180 displays a reproduction screen for the specific object 450 (FIG. 13(b)). The reproduction information screen 1201 may include control buttons 451. The reproduction information screen 1201 and the control buttons 451 may be displayed on the screen after the touch operation has been executed.

Additionally, if the specific object is touched on the rear surface, the controller 180 may display additional information 453, such as album related information including the multimedia file, singer related information, actor related information, writer related information, and composer related information, relating to the specific object. The controller 180 may display the main menu screen as shown in FIG. 13(d) when the touch operation on the rear surface has terminated. As disclosed with respect to FIGS. 12 and 13, various operations may be associated with the specific object displayed in a menu of the mobile terminal 100. Thus, even if the same menu or the same object associated with the menu is touched on the same surface, a different operation may be executed according to a preset environment setup.

Figure 14:
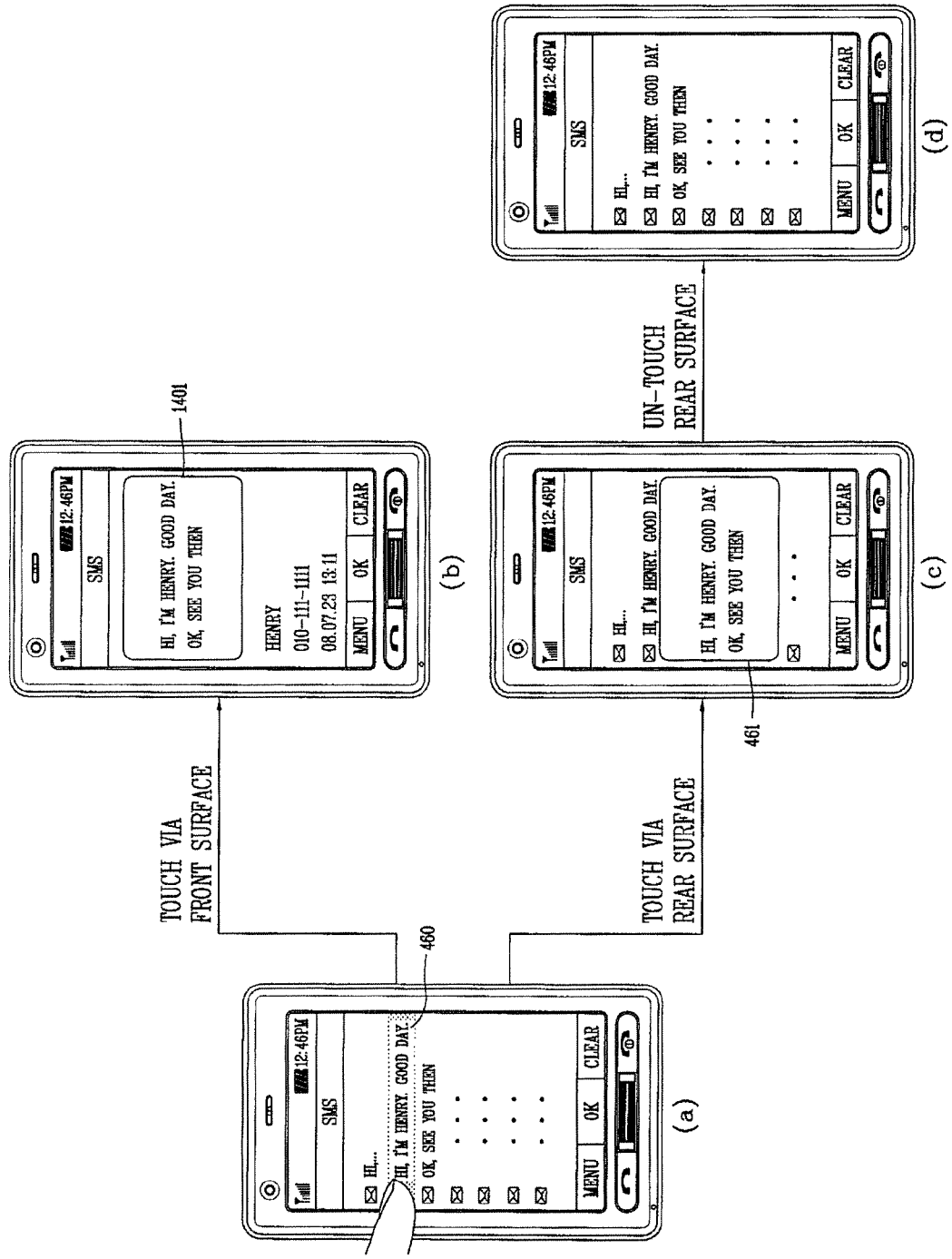
FIG. 14 illustrates a method for selecting and executing an object of a mobile terminal according to another embodiment of the present invention.

FIG. 14 illustrates a method for selecting an object and executing a function associated with the object in a mobile terminal according to another embodiment of the present invention.

FIG. 14(a) illustrates a screen for viewing a short message (SMS) list displayed on the front surface, FIG. 14(b) illustrates a screen viewed on the front surface when a specific object, such as a SMS item is touched via the front surface, and FIG. 14(c) illustrates a screen viewed on the front surface when the specific object is touched via the rear surface.

As illustrated in FIG. 14(a), if a specific object 460 is touched on the front surface, the controller 180 enters a SMS edit menu 1401 for the specific object 460 (FIG. 14(b)). The SMS edit menu 1401 may allow a user to edit the content of the SMS or view information associated with the SMS. The SMS edit menu 1401 may be displayed on the screen after the touch operation has been executed.

Additionally, if the specific object is touched via the rear surface, the controller 180 displays the contents of the specific object 460 on a preview screen 461 as shown in FIG. 14(c). The user may check the message contents via the preview screen. Specifically, the user does not have to navigate through various menus to see the content of a message. The controller 180 may display the main menu screen as shown in FIG. 14(d) when the touch operation on the rear surface has terminated.

In the embodiment described with respect to FIG. 14, the first operation refers to the operation of entering the SMS edit menu 1401, and the second operation refers to the operation of displaying the preview screen for the content of the selected object, such as the SMS.

Additionally, various operations may be associated with the specific object displayed in a menu of the mobile terminal 100. Thus, even if the same menu or the same object associated with the menu is touched on the same surface, a different operation may be executed according to a preset environment setup. For example, although not shown, if the specific object, is touched on the rear surface, the controller 180 may display additional information associated with the specific object, such as sender information, the number of messages sent/received with the sender, and message items.

As described above, the method for executing various operations associated with a specific object touched via a specific touch screen may be applied to an operation of outputting information during a phone call. For example, although not shown, if a phonebook or an object related to another party on the phone is touched on the rear surface, a call history with the another party, such as call information, and message sending/reception information, may be displayed. Additionally, additional information related another party, such as group, memo, and photograph may be displayed. If the object associated to the another party is touched on the front surface, a call may be connected to another party or a message may be sent to the another party.

Figure 15:
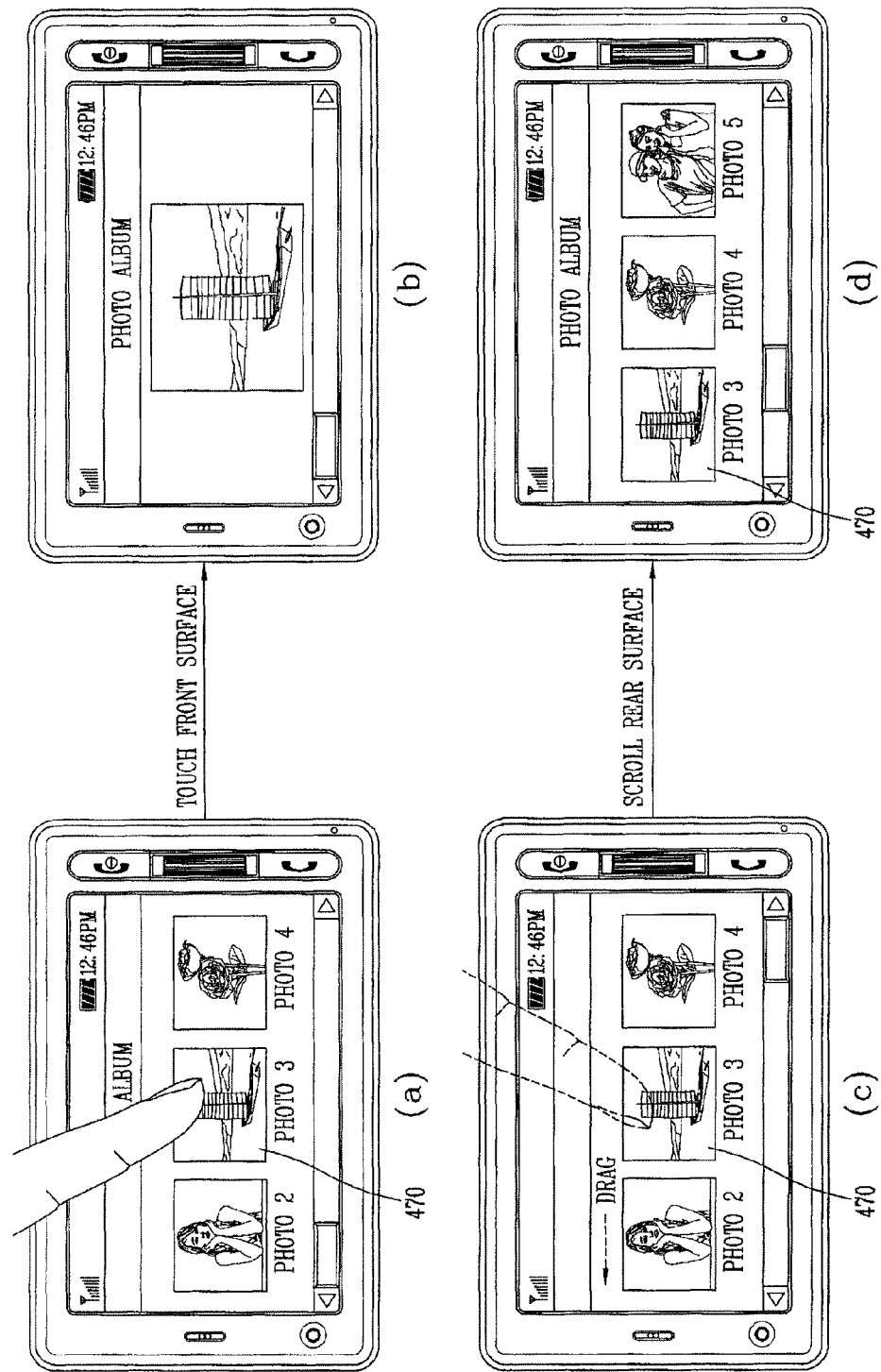
FIG. 15 illustrates a method for selecting and executing an object via a touch input in a mobile terminal according to another embodiment of the present invention.

FIG. 15 illustrates a method for selecting an object and executing a function associated with the object in a mobile terminal according to another embodiment of the present invention.

The method for executing various operations associated with a selected object according to a surface on which the specific object is touched may be applied to a scroll operation of a screen. For example, if a user touches and drags a scroll bar on the front surface, the screen on which the scroll bar is located may be maintained even after the touch has been released from the front surface.

However, if the user touches and drags the scroll bar on the rear surface, the screen may return to the original position before dragging the scroll bar when the touch has been released from the rear surface.

The scroll function denotes a function of displaying objects that are currently not displayed on the screen by moving the contents displayed on a screen vertically or horizontally. Generally, objects are not currently displayed on the screen, when the number of objects associated with a menu or category, such as documents, photographs, and web-pages, exceeds the number of objects which the screen may display.

A scroll bar is generally touched and dragged in the desired direction in order to scroll the specific information in a desired direction. However, similar to a scroll bar, a specific object may be touched and dragged in a desired direction, such that the touched and dragged object initiates a scroll function.

Nevertheless, the method of touching the screen to execute a scroll function may result in errors. For example, if an object is touched via a pressure which is greater than a preset pressure level or if an object is touched more than once, then an unintended function may execute, thus leading to an erroneous result.

However, as shown in the current embodiment of the present invention, the method for dividing the selection of an object and the execution of a function associated with the object according to a touch surface may prevent the touch error described above. For example, as shown in FIG. 15(a), if an object 470, such as a picture thumbnail, is touched via the front surface of the mobile terminal 100, the controller 180 may execute a function associated with the object 470 (FIG. 15(b)). Additionally, as shown in FIG. 15(c), if a user touches the object 470 on the rear surface and drags the object 470 in a direction, such as left, the object 470 may be scrolled in the direction as shown in FIG. 15(d).

As discussed above, various objects such as, a text message list, a call connection list, a multimedia file list including music, photograph, or video, may be scrolled on the display. If the object is selected via the front surface, then a function associated with the object may be executed. For example, if a multimedia file, such as a music file, is selected, the music file may be executed such that the mobile terminal outputs the sound associated with the music file.

Figure 16:
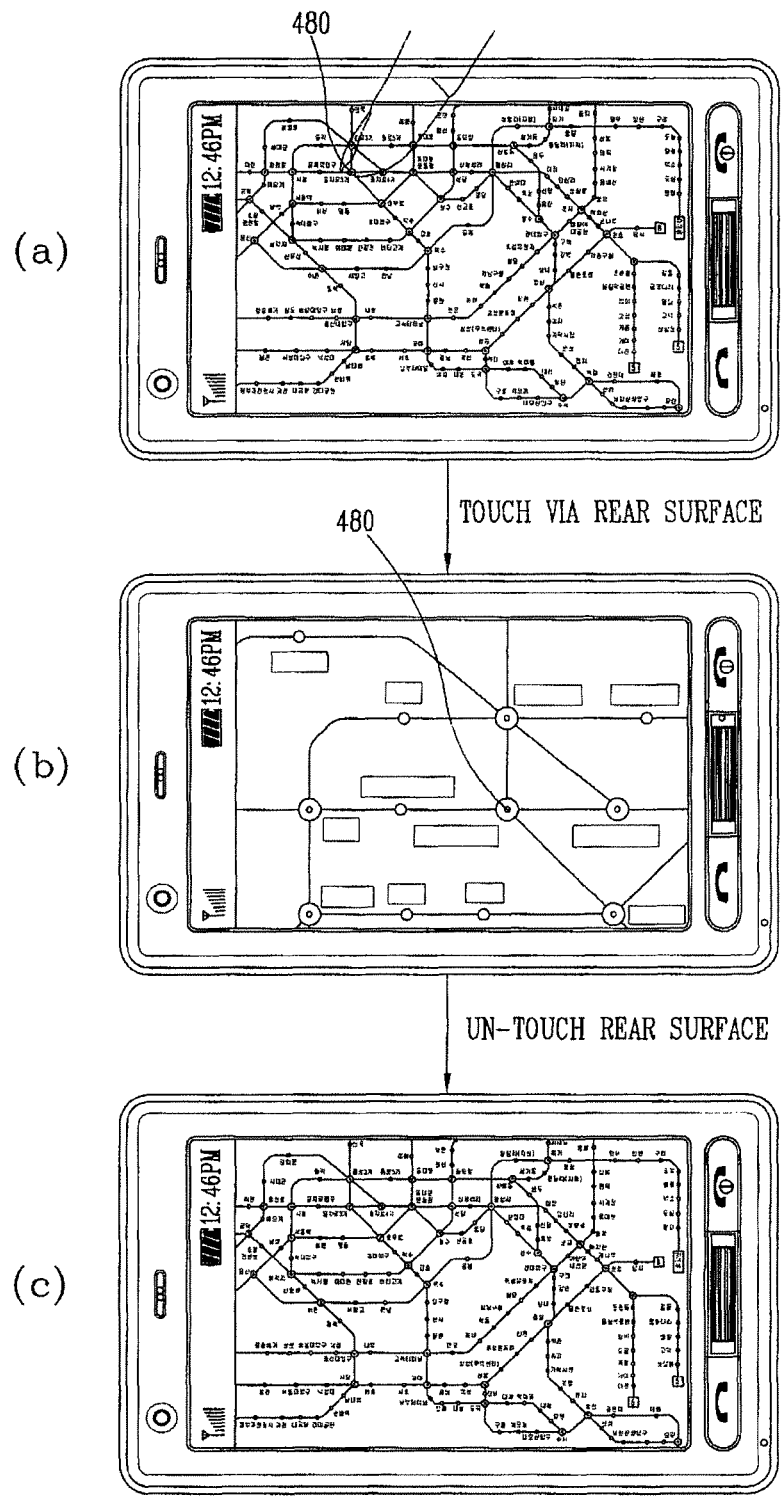
FIG. 16 illustrates a method for selecting and executing an object via a touch input in a mobile terminal according to another embodiment of the present invention.

FIG. 16 illustrates a method for selecting an object and executing a function associated with the object in a mobile terminal according to another embodiment of the present invention.

FIG. 16(a) illustrates a map of subway lines displayed on the front surface of the mobile terminal 100. If a specific object 480, such as a subway station, is touched on the rear surface, the controller 180 may enlarge the map to a predetermined size associated with the specific object 480 and display the enlarged region on a preview screen as shown in FIG. 16(b). The controller 180 may display the original screen as shown in FIG. 16(c) when the touch operation on the rear surface has terminated.

Additionally, if the user drags to another region while maintaining the touch via the rear surface (not shown), the enlarged region may scroll according to the user's drag operation. Furthermore, the user may select a plurality of objects, such as subway stations, to determine the route between the selected object. Finally, the user may touch the object via the front surface. The object may be selected on the entire map of subway lines (FIG. 16(a)), or the enlarged map of subway lines (FIG. 16(b)).

Figure 17:
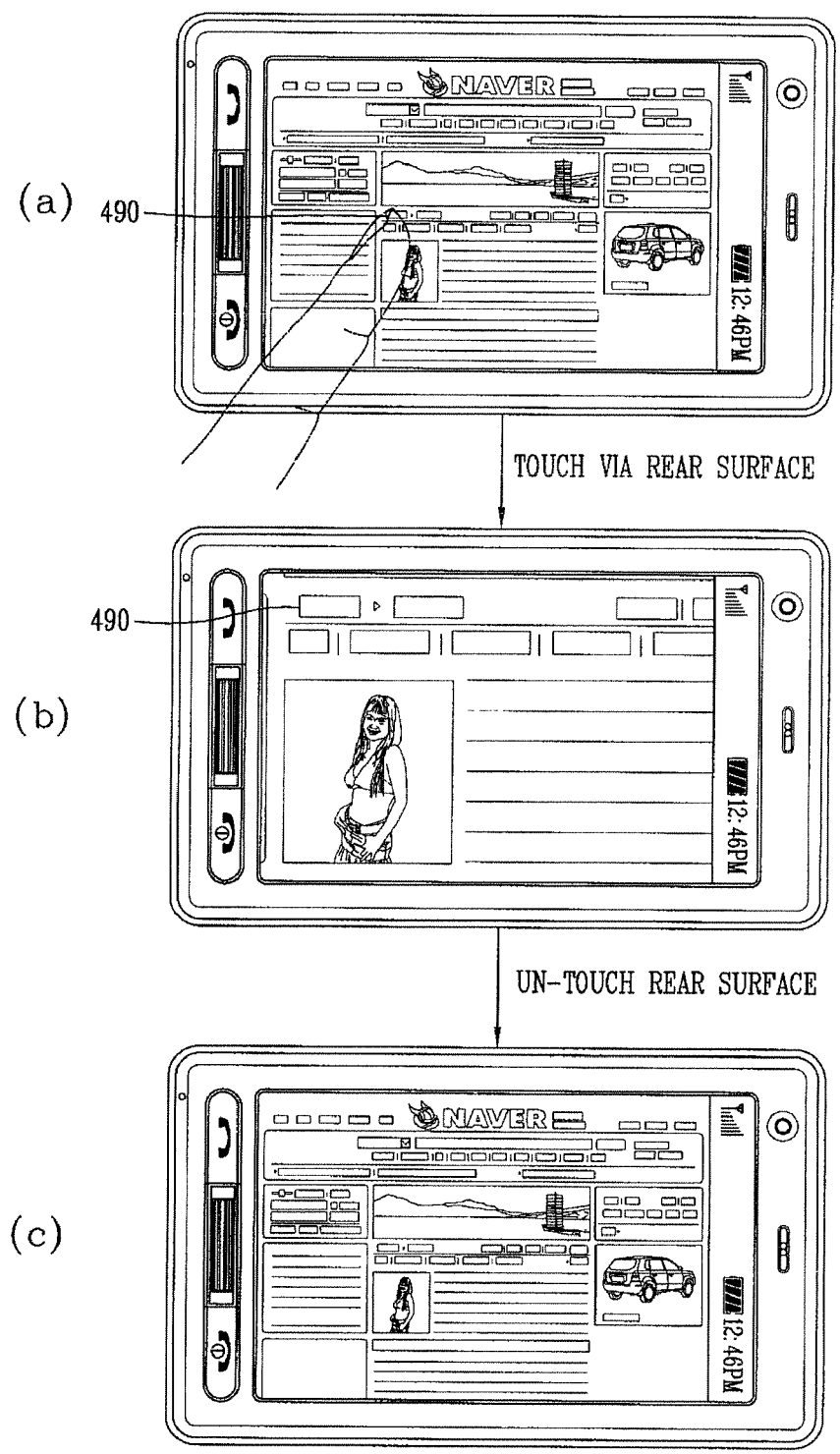
FIG. 17 illustrates a method for selecting and executing an object via a touch input in a mobile terminal according to another embodiment of the present invention.

FIG. 17 illustrates a method for selecting an object and executing a function associated with the object in a mobile terminal according to another embodiment of the present invention.

FIG. 17(a) illustrates a web browser screen displayed on the front surface of the mobile terminal 100. If a specific object 490, such as a specific area of a web page, of a web browser screen is touched on the rear surface, the controller 180 may display a preview screen as shown in FIG. 17(b). The preview screen may refer to an enlarged image of the specific object 490. The controller 180 may display the original screen as shown in FIG. 17(c) when the touch operation on the rear surface has terminated. Additionally, although not shown, if an area of an image is touched via the rear surface, the image may be displayed in the enlarged state.

As described above, each operation executed according to the surface which the object is touched may be preset according to an environment setup option (not shown). However, the present invention may not be limited to the aforementioned operations.

Hereinafter, a multitasking method for executing preset menus according to a surface which a touch is input will be described. Specifically, the executed menus may not be associated with a specific object of previously executed menus. However, information associated with the specific object may be used by the executed menus.

Figure 18:
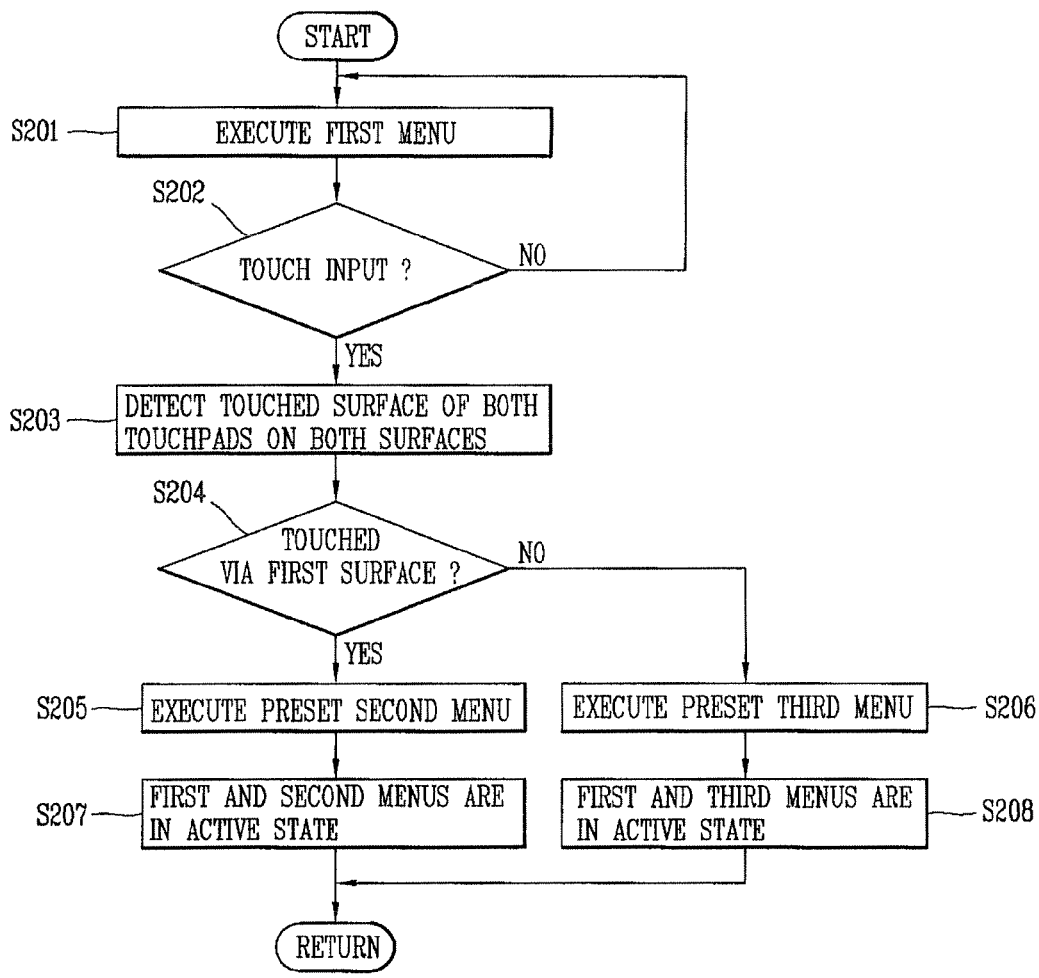
FIG. 18 is a flowchart illustrating a multitasking method using a touch input in a mobile terminal according to an embodiment of the present invention.

FIG. 18 is a flowchart showing a multitasking method using a touch input in a mobile terminal according to an embodiment of the present invention.

It is assumed that a first menu has already been executed on the mobile terminal (S201). Accordingly, various objects may be displayed on an execution screen of the first menu. As described above, a user may touch the objects associated with the first menu, and execute a function associated with the touched object.

Furthermore, a user may access additional menus, such as a second or third menu, independent from the first menu. Specifically, while the first menu is executed, the user may touch the front or rear surface of the transparent display module in order to execute the second or third menu. Accordingly, a multitasking operation may be executed by touching one of both surfaces of the transparent display module.

When a transparent display module is touched in the state of a first menu being executed (S201, S202), the controller 180 may determine the touched surface of the two surfaces of the transparent display module (S203). The controller 180 may execute a preset second or third menu according to the touched surface. Specifically, if a touch is input via a first surface, such as the front surface (S204), the preset second menu may be executed (S205). Additionally, if the touch is input via a second surface, such as a rear surface, the preset third menu may be executed (S206).

More specifically, if the touch is input via the first surface, the first and second menus are executed (S207), and if the touch is input via the second surface, the first and third menus are executed (S208). Moreover, if the second or third menu are not associated with the first menu, information associated to the first menu may be used by the second or third menu.

Figure 19B:
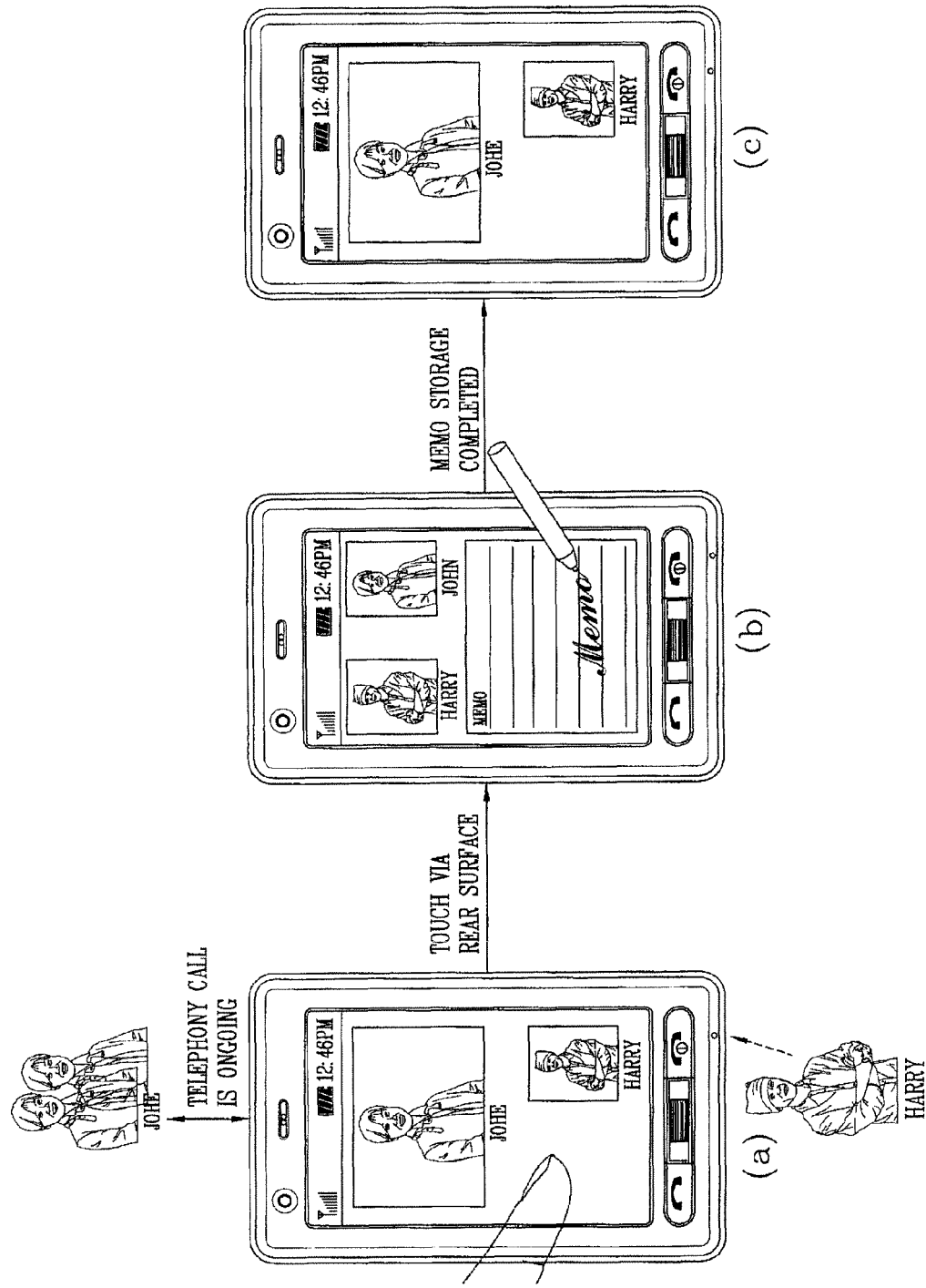

FIGS. 19A and 19B illustrate a multitasking method using a touch input in a mobile terminal according to an embodiment of the present invention.

FIG. 19A illustrates a screen for writing a memo, schedule, or text message to send to another party during a telephone call when the front surface of both surfaces of the display module is touched. FIG. 19B illustrates a screen for writing or editing a memo, schedule or text message when the rear surface is touched.

FIGS. 19A(a) and 19B(a) illustrate a telephone call screen displayed on the front surface. The second and third menus activated in FIGS. 19A and 19B are not associated with the first menu. Specifically, the second and third menus may not directly select an object or execute a function associated with an object displayed in the first menu. However, the second and third menus may utilize information associated with the object of the first menu. For example, if the first menu is a menu for a telephone call and the second menu is a menu for a short message, information associated with a calling party may be used in the second menu during the telephone call.

In this embodiment, the second or third menu may include a menu for writing a memo, schedule or text message. The controller 180 may display the screen for the first menu to be relatively transparent if an execution screen of the second or third menu is displayed, furthermore, the controller 180 may display the execution screen for the second or third menu to be relatively sharp. Alternatively, the controller 180 may display the execution screen for the second or third menu to be relatively transparent, while displaying the screen for the first menu to be relatively sharp.

The screen processing described above may be executed until the memo, schedule or text message is written or the sending is completed. Furthermore, a transparent screen may be processed as an opaque screen.

As illustrated in FIG. 19A(a), if the front surface is touched during a telephone call, the controller 180 may activate the second menu, such as a menu for short message, which uses information, such as a phone number of another party, associated with the first menu. The execution screen of the second menu may also display information associated with the party receiving a message. For example, the thumbnail of the party may be displayed (FIG. 19A(b)), or the image of the party may be displayed as a background image (FIG. 19A(c)). Alternatively, the name or phone number of the party may be displayed at one side of the execution screen of the second menu (not shown). The controller 180 may display a new display screen (FIG. 19A(d)) or the original screen (FIG. 19A(a)) when the second menu is deactivated.

As illustrated in FIG. 19B(a), if the rear surface is touched when a telephone call is executed, the controller 180 may activate a third menu, such as a menu for writing a memo, not associated with the first menu. As shown in FIG. 19B(b), the controller 180 may adjust the size of the execution screen of the first menu and display the execution screen of the third menu at one side of the display region. The first or third menu may be displayed in an overlapping manner by adjusting its transparency (not shown). The controller 180 may display the original screen (FIG. 19B(c)) when the third menu is deactivated.

The present invention is not limited to the embodiments described above. Other functions which were not described may be executed. For example, while browsing the Internet via a browser (first menu), other functions such as playing games, downloading files, and viewing documents, may be executed (second or third menu).

Additionally, during the multitasking operation, a plurality of menu execution screens may be displayed as overlapped with each other. Each menu execution screen may be referred to as a layer, the uppermost layer may be displayed on the front surface, and the lowermost layer may be obscured by the upper layers so as not to be displayed on the front surface.

Therefore, as several menu windows are overlapped with each other, if the menu activation window of the lower layer is obscured by the menu window of the upper layer, the touch input via two surfaces according to the present invention may allow for the menu window of the lower layer to be moved to the upper layer in order to be visible.

For example, as illustrated in FIG. 20(a), a front surface of a mobile terminal 100 may display a first menu 2001, such as a menu for viewing and editing a SMS message. Additionally, as illustrated in FIG. 20(b), the first menu 2001, may be one of four active menu windows 2001-2004. Accordingly, a user may touch the rear surface and move the lowest active menu window, fourth active menu window 2004, to the uppermost layer. Accordingly, the menu window of the lowermost layer may be displayed on the front surface (FIG. 20(c)), i.e. the fourth active menu window 2004 may overlap the first menu window 2001 (FIG. 20(d)).

Figure 21:
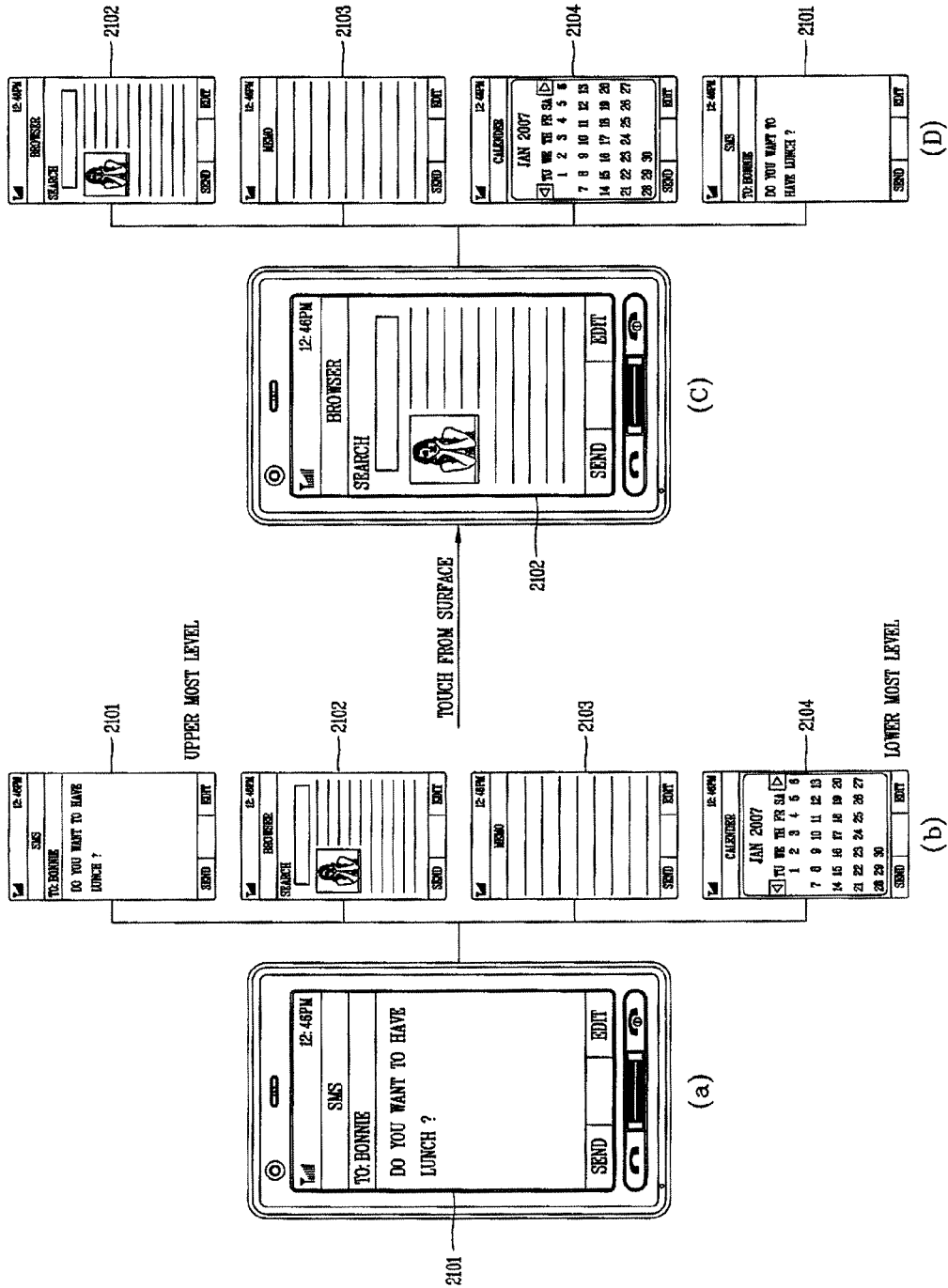
FIG. 21 illustrates a method for selecting a menu via a touch input in a mobile terminal according to another embodiment of the present invention.

Alternatively, the user may touch the front surface in order to push down the uppermost menu window, such as the first menu window, to the lowermost layer. As illustrated in FIG. 21(a), the front surface of a mobile terminal 100 may display a first menu 2101, such as a menu for viewing and editing a SMS message. Additionally, as illustrated in FIG. 21(b), the first menu 2101, may be one of four active menu windows 2101-2104. Accordingly, a user may touch the front surface and move the uppermost active menu window, first active menu window 2101, to the lowermost lawyer. Accordingly, the second active menu window 2102 may be displayed on the front surface (FIG. 21(c)), and the first active menu window 2101 may be moved to the lowermost level (FIG. 20(d)).

Alternatively, the layers of the menu windows may be sequentially moved according to the number of touches executed on the front or rear surface according to a preset environment setup (not shown). Touch pressure, touch speed, or continuous touch time may be used in order to detect a touch operation.

The above described data processing method in a mobile terminal with a touch screen according to the present invention may be written as computer programs and may be implemented in general-use digital computers that execute the programs using a computer readable recording medium.

The data processing method in a mobile terminal with a touch screen according to the present invention may be executed through software. In this case, constituent means of the present invention are code segments carrying out required works. Programs or code segments may be stored in a processor readable medium and transmitted according to computer data signals combined with carriers in a transmission medium or a communication network.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium may also be distributed over networked computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
a transparent display unit comprising a front surface and a rear surface, and configured to display an object;
a first touch sensor defined within the front surface;
a second touch sensor defined within the rear surface; and
a control unit configured to execute a first operation associated with the displayed object that responds to an input received at the first touch sensor and to execute a second operation associated with the displayed object that responds to an input received at the second touch sensor,
wherein the control unit is further configured to execute a different operation associated with the displayed object based upon on which of the first and second touch sensors the input is received.

2. The terminal of claim 1, wherein the first operation is a function associated with the displayed object.

3. The terminal of claim 1, wherein the second operation is a preview of information associated with the displayed object.

4. The terminal of claim 1, wherein the first operation and the second operation are set according to a type of the displayed object.

5. The terminal of claim 4, wherein other operations are set according to the type of the displayed object.

6. The terminal of claim 1, wherein the controller is further configured to activate a second menu in response to an input received at the first touch sensor or the second touch sensor when a first menu is active, and to deactivate the first menu in response to activating the second menu.

7. The terminal of claim 6, wherein the second menu is displayed according to the location on the first touch sensor.

8. The terminal of claim 6, wherein the controller is further configured to control the second menu to utilize information associated with the first menu.

9. The terminal of claim 6, wherein the first menu and the second menu are layered such that the activated second menu overlaps the deactivated first menu.

10. The terminal of claim 9, wherein the controller is further configured to control the transparent display unit to display the activated second menu relatively sharper than the deactivated first menu.

11. The terminal of claim 9, wherein the controller is further configured to deactivate the activated second menu in response to a second input received at the first touch sensor and to activate the deactivated first menu in response to a third input received at the second touch sensor.

12. A method for controlling a mobile terminal, the method comprising:
displaying an object on a transparent display unit comprising a front surface and a rear surface;
executing a first operation associated with the displayed object that responds to an input received at a first touch sensor defined within the front surface; and
executing a second operation associated with the displayed object that responds to an input received at a second touch sensor defined with the second surface,
wherein the control unit executes a different operation associated with the displayed object based upon on which of the first and second touch sensors the input is received.

13. The method of claim 12, wherein the first operation is a function associated with the displayed object.

14. The method of claim 12, wherein the second operation is a preview of information associated with the displayed object.

15. The method of claim 14, further comprising:
setting the first operation and the second operation according a type of the displayed object.

16. The method of claim 15, further comprising:
setting other operations according a type of the displayed object.

17. The method of claim 12, further comprising:
activating a second menu in response to an input received at the first touch sensor or the second touch sensor when the first menu is active; and
deactivating the first menu in response to activating the second menu.

18. The method of claim 17, further comprising:
displaying the second menu according to a location on the first touch sensor.

19. The method of claim 17, wherein the second menu utilizes information associated with the first menu.

20. The terminal of claim 17, further comprising:
layering the first menu and the second menu such that the activated second menu overlaps the deactivated first menu.

21. The terminal of claim 20, further comprising:
displaying the activated second menu relatively sharper than the deactivated first menu.

22. The terminal of claim 20, further comprising:
deactivating the activated second menu in response to a second input received at the first touch sensor; and
activating the deactivated first menu in response to a third input received at the second touch sensor.

* * * * *